United States Patent
Sullivan

(10) Patent No.: US 8,986,414 B2
(45) Date of Patent: Mar. 24, 2015

(54) METHOD OF ADHERING A PLEATED FILTRATION MEDIA AND FILTER AND MEDIA FILTER STACK USING SAME

(71) Applicant: Challen Sullivan, Delray Beach, FL (US)

(72) Inventor: Challen Sullivan, Delray Beach, FL (US)

( * ) Notice: Subject to any disclaimer, the term of this patent is extended or adjusted under 35 U.S.C. 154(b) by 136 days.

(21) Appl. No.: 13/781,648

(22) Filed: Feb. 28, 2013

(65) Prior Publication Data

US 2013/0219844 A1 Aug. 29, 2013

Related U.S. Application Data

(60) Provisional application No. 61/604,523, filed on Feb. 29, 2012.

(51) Int. Cl.
*B01D 46/00* (2006.01)
*B01D 46/52* (2006.01)
(Continued)

(52) U.S. Cl.
CPC .......... *B01D 46/0001* (2013.01); *B01D 46/526* (2013.01); *B01D 46/0005* (2013.01); *B01D 46/522* (2013.01); *B01D 46/523* (2013.01);
(Continued)

(58) Field of Classification Search
CPC ....... B01D 46/01; B01D 46/05; B01D 46/526
USPC .............. 55/496, 521, 351, 352, 354; 95/273, 95/277; 96/429
See application file for complete search history.

(56) References Cited

U.S. PATENT DOCUMENTS

| 1,982,639 | A | 12/1934 | Christofferson |
| 2,016,991 | A | 10/1935 | Dollinger |

(Continued)

FOREIGN PATENT DOCUMENTS

| DE | 19654844 | 7/1998 |
| JP | 6079194 | 3/1994 |

(Continued)

OTHER PUBLICATIONS

"OptimAir Filtration System", product brochure [online], Optimum Clean Air, LLC, 2012 [retrieved on May 15, 2012], Retrieved from the Internet; <URL: http://www.optimair.com/>, 1 page.

*Primary Examiner* — Jason M Greene
*Assistant Examiner* — Karla Hawkins
(74) *Attorney, Agent, or Firm* — Tangent Law Group, PLLC; Eric J. Weierstall, Esq.

(57) ABSTRACT

A method of manufacturing a selected spacing folded, pleated media by preparing a pre-pleated sheet of filter media having pleats with peaks and troughs throughout its length applying an at least one adhesive element along the pre-pleated sheet of filter media; advancing and cutting the pre-pleated sheet of material; compressing the cut length of pre-pleated sheet of filter material, resulting in folding of the pleats and adherence of the pleats into a folded, pleated filter media stack that is selectively separable; selectively separating the media stack and selecting a pleat spacing for a selected pleat spacing section application of an at least one spacing support element at the peaks of each pleat and refolding and recompressing into a selected spacing folded, pleated media stack wherein the media stack is adhered and can be selectively removed to extend from a compacted state to a deployed state with the selected pleat spacing.

33 Claims, 19 Drawing Sheets

(51) Int. Cl.
   *B01D 29/01* (2006.01)
   *B01D 29/07* (2006.01)
   *B01D 46/10* (2006.01)

(52) U.S. Cl.
   CPC .............. *B01D 29/012* (2013.01); *B01D 29/07* (2013.01); *B01D 46/10* (2013.01); *B01D 2201/12* (2013.01); *B01D 2201/127* (2013.01)
   USPC .................. 55/496; 55/351; 55/352; 55/521; 96/273; 96/277; 95/429

(56) References Cited

U.S. PATENT DOCUMENTS

| | | | |
|---|---|---|---|
| 2,500,123 | A | 3/1950 | Gwaltney et al. |
| 2,808,699 | A | 10/1957 | Hofstetter |
| 3,276,191 | A | 10/1966 | Revell |
| 3,321,345 | A | 5/1967 | Duncan et al. |
| 3,337,898 | A | 8/1967 | Schmid et al. |
| 3,408,795 | A | 11/1968 | Revell et al. |
| 3,596,442 | A | 8/1971 | Neumann |
| 3,695,008 | A | 10/1972 | Neumann |
| 3,774,373 | A | 11/1973 | Welch et al. |
| 3,985,528 | A | 10/1976 | Revell |
| 4,054,521 | A | 10/1977 | Winzen |
| 4,221,576 | A | 9/1980 | Phillips, Jr. |
| 4,394,146 | A | 7/1983 | Klein |
| 4,405,342 | A | 9/1983 | Bergman |
| 4,470,833 | A | 9/1984 | Wolfe |
| 5,098,767 | A | 3/1992 | Linnersten |
| 5,217,513 | A | 6/1993 | Armbruster |
| 5,405,434 | A | 4/1995 | Inculet |
| 5,560,835 | A | 10/1996 | Williams |
| 5,906,752 | A | 5/1999 | Williams |
| 5,912,423 | A | 6/1999 | Dought et al. |
| 6,152,998 | A | 11/2000 | Taylor |
| 6,168,646 | B1 | 1/2001 | Craig et al. |
| 6,402,822 | B1 | 6/2002 | Najm |
| 6,454,834 | B1 | 9/2002 | Livingstone |
| 6,491,735 | B2 | 12/2002 | Najm |
| 6,596,059 | B1 | 7/2003 | Geist et al. |
| 6,632,269 | B1 | 10/2003 | Najm |
| 6,743,282 | B2 | 6/2004 | Najm |
| 6,843,834 | B2 | 1/2005 | Schumacher |
| 7,151,264 | B2 | 12/2006 | Ehlers, Sr. |
| 7,186,290 | B2 | 3/2007 | Sheehan et al. |
| 7,244,294 | B2 | 7/2007 | Kates |
| 7,896,940 | B2 | 3/2011 | Sundet et al. |
| 8,313,567 | B2 | 11/2012 | Sullivan |
| 2003/0230061 | A1 | 12/2003 | Kubokawa et al. |
| 2005/0150382 | A1 | 7/2005 | Sheehan et al. |
| 2006/0070527 | A1 | 4/2006 | Chapman et al. |
| 2006/0102006 | A1 | 5/2006 | Powell |
| 2008/0041026 | A1* | 2/2008 | Engel et al. .................... 55/432 |
| 2008/0066435 | A1* | 3/2008 | Engel et al. .................... 55/492 |
| 2008/0072763 | A1 | 3/2008 | Hauville |
| 2011/0065127 | A1 | 3/2011 | Sullivan |

FOREIGN PATENT DOCUMENTS

| | | |
|---|---|---|
| JP | 6233945 | 8/1994 |
| JP | 6246120 | 9/1994 |
| JP | 7275626 | 10/1995 |
| JP | 11104416 | 4/1999 |
| WO | 0204091 | 1/2002 |

* cited by examiner

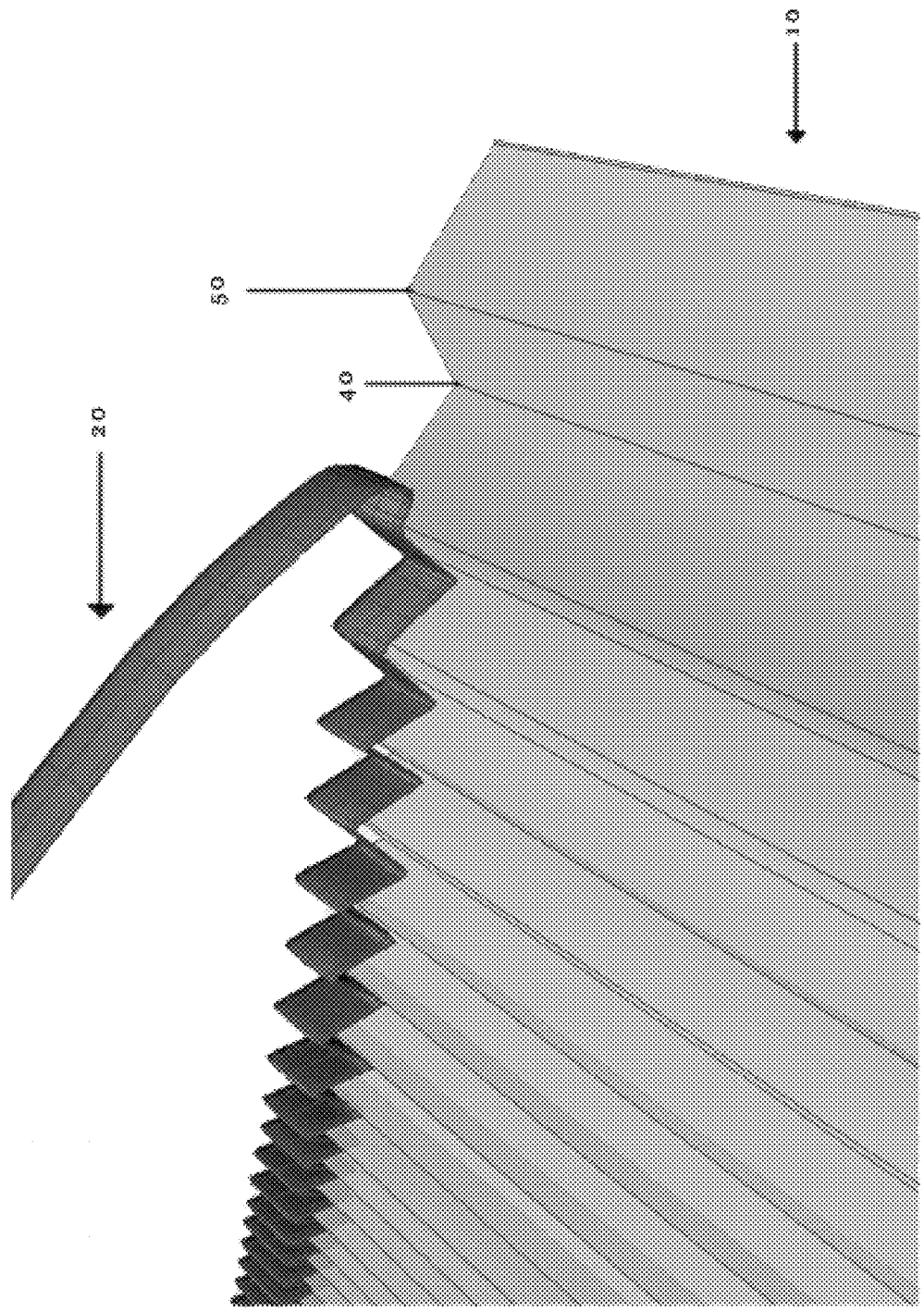

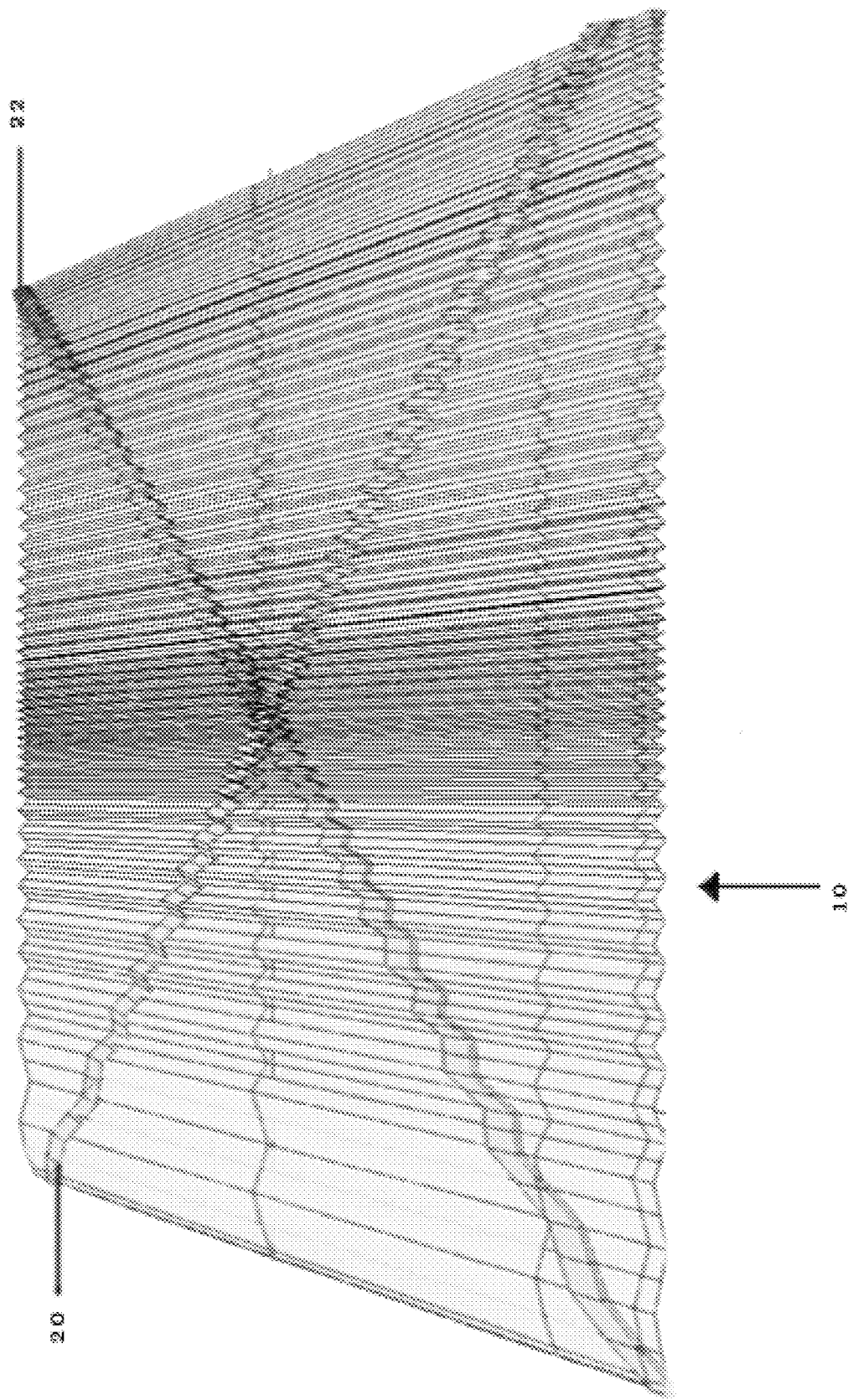

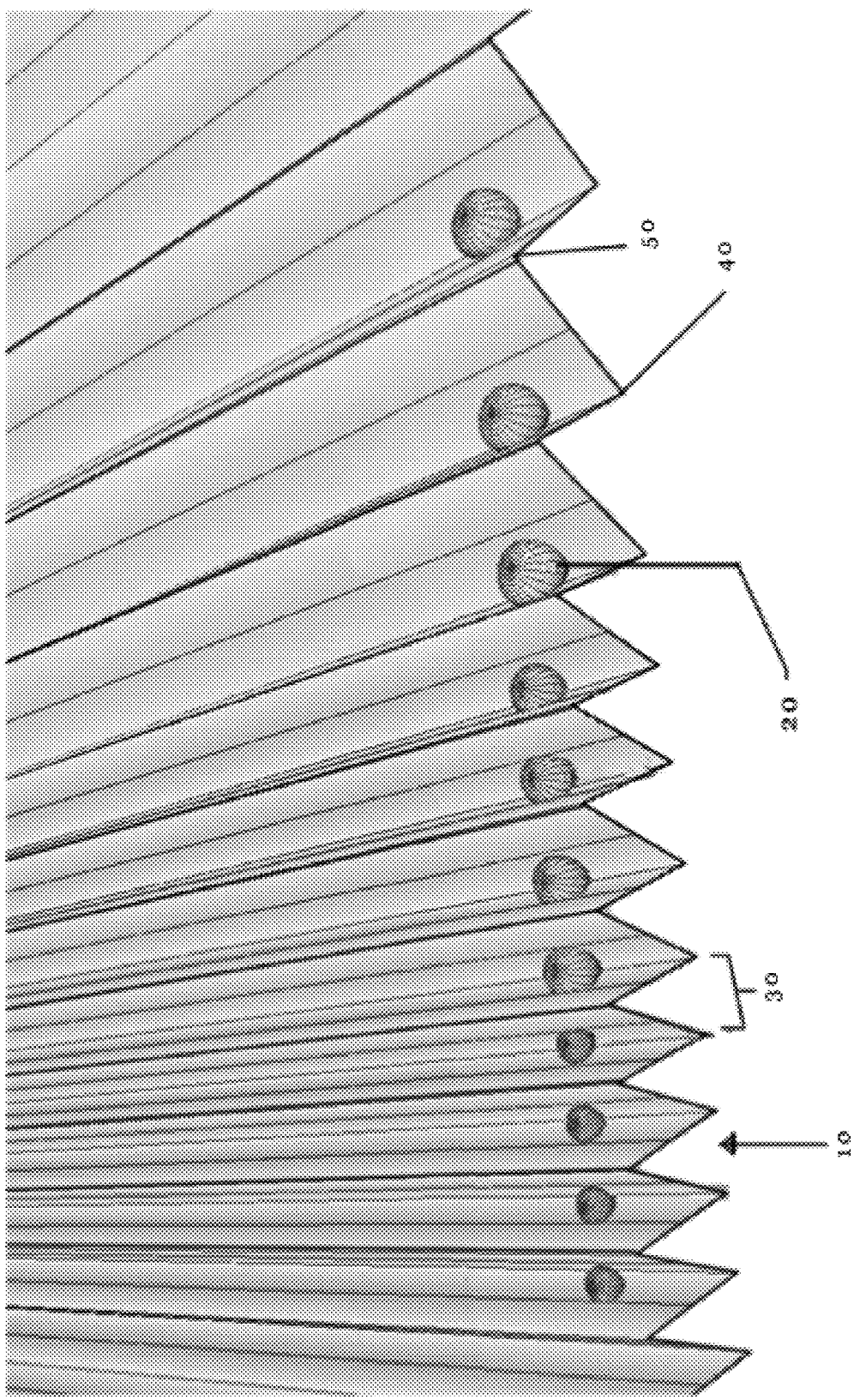

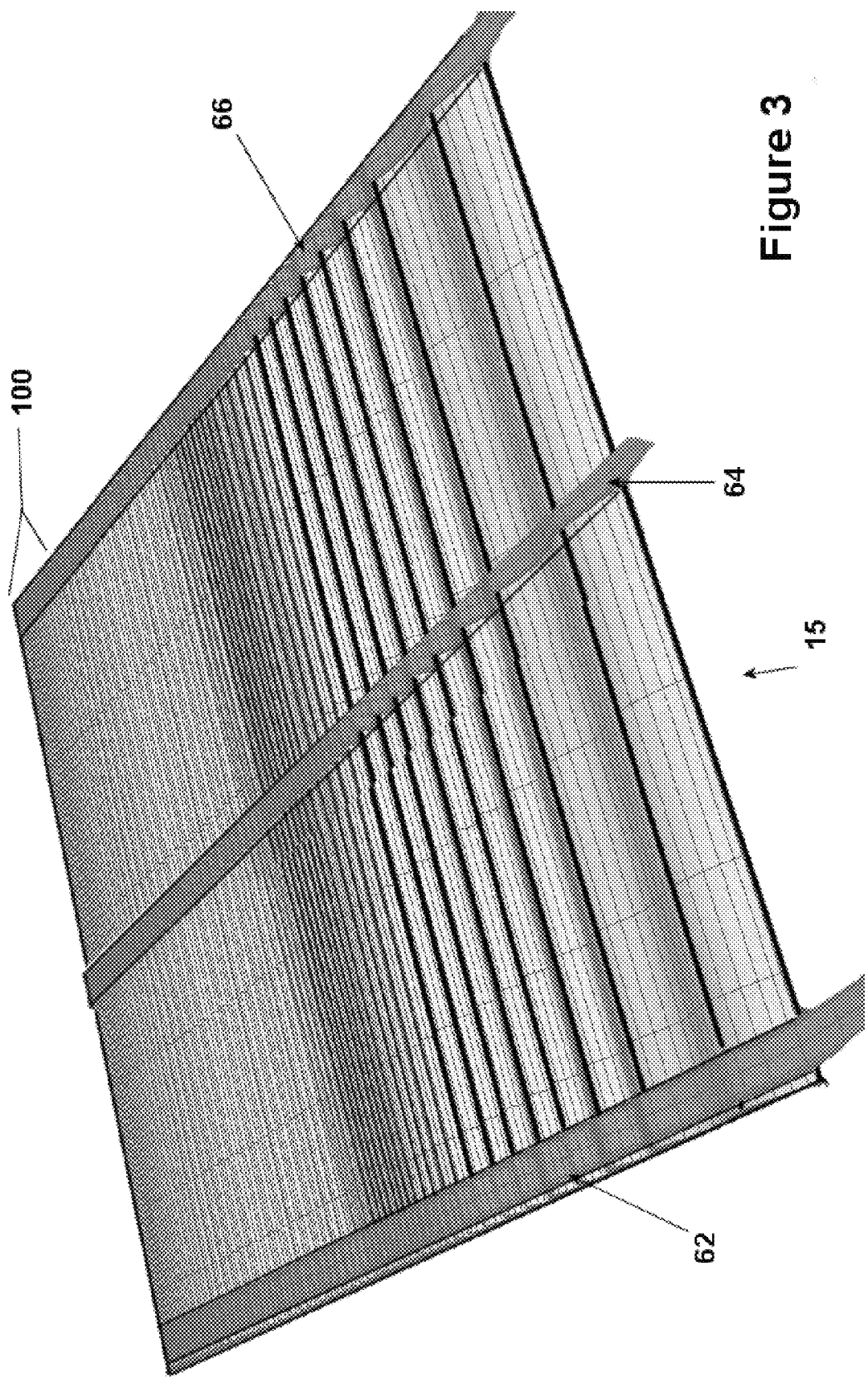

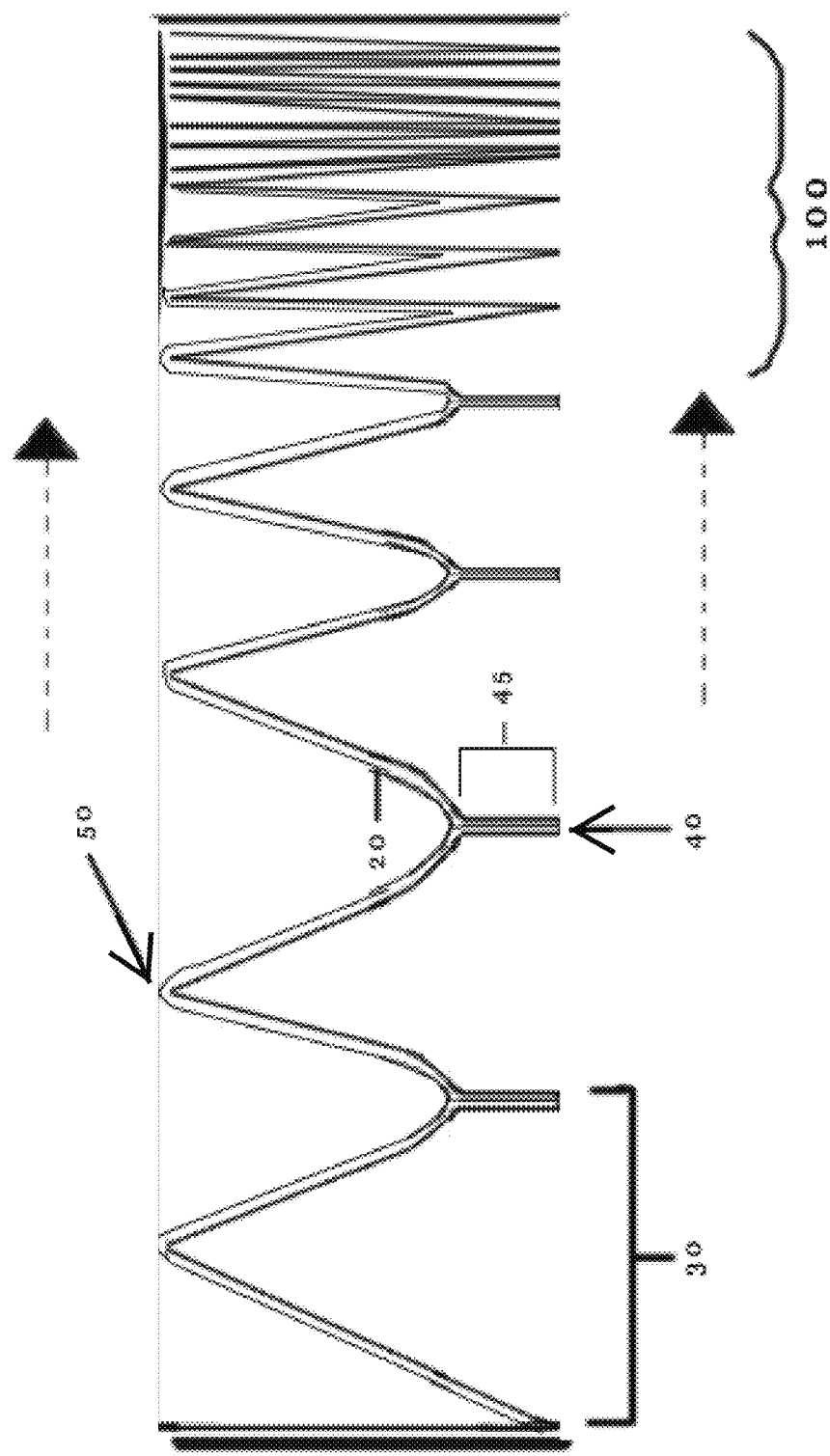

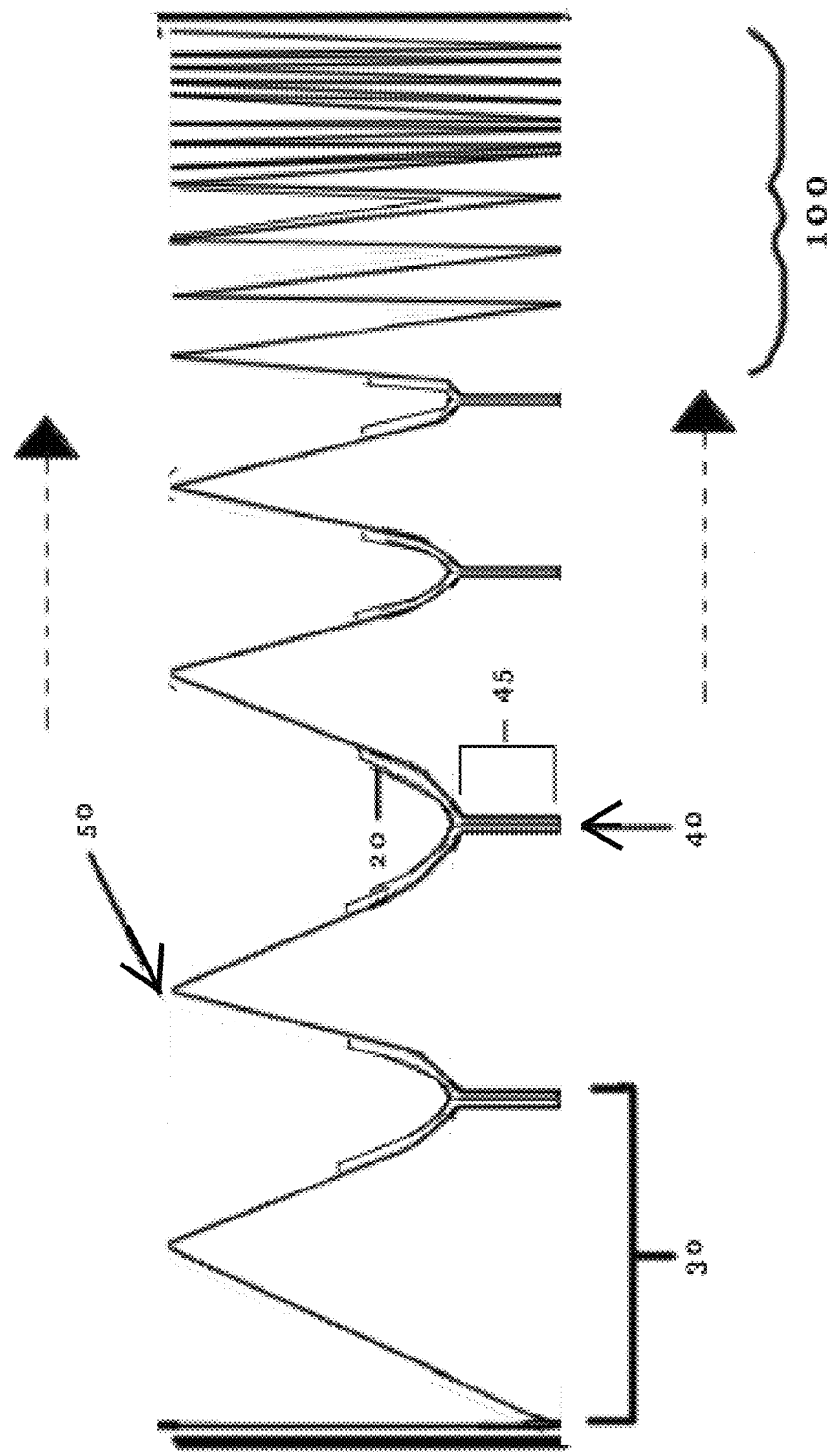

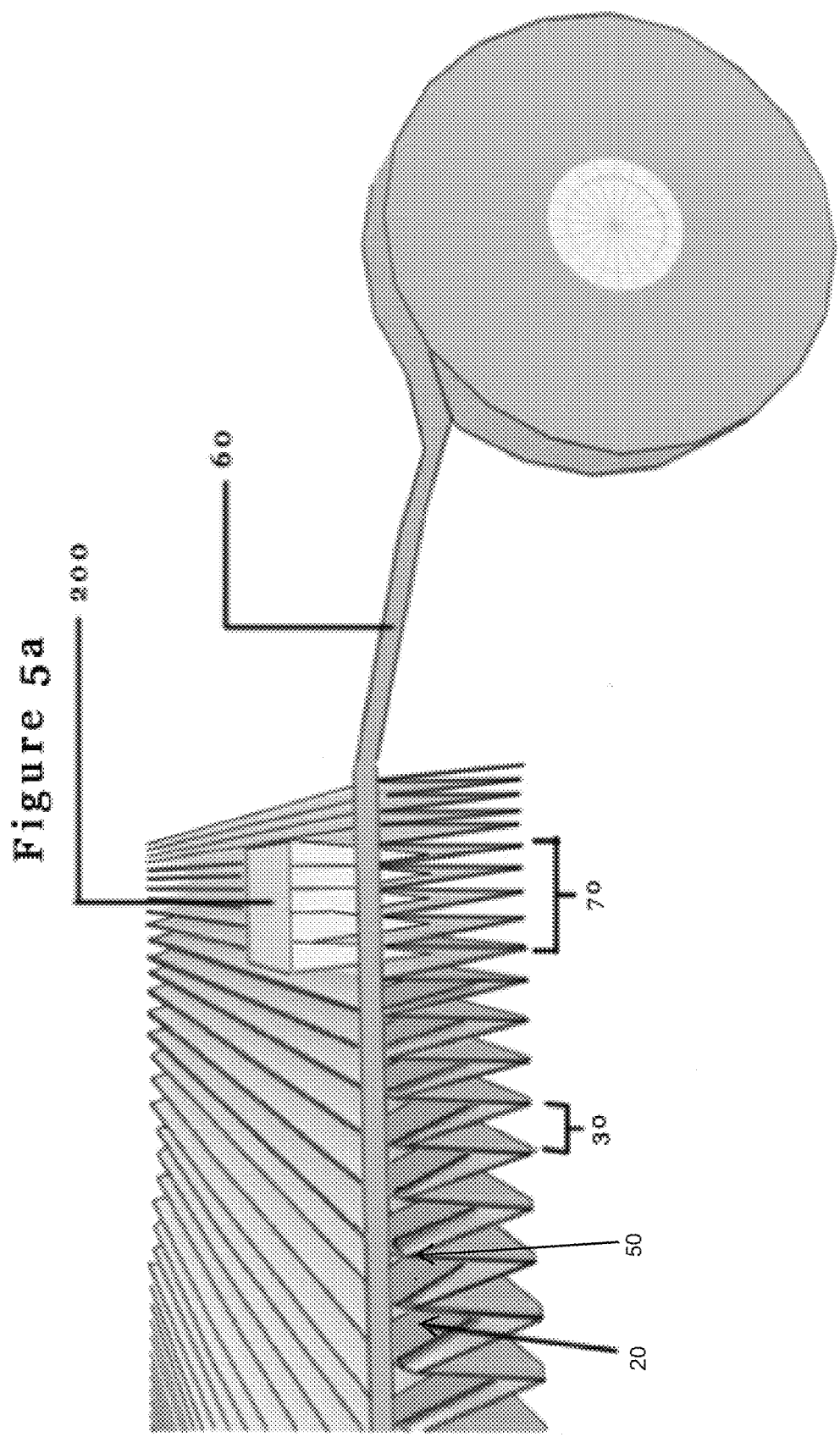

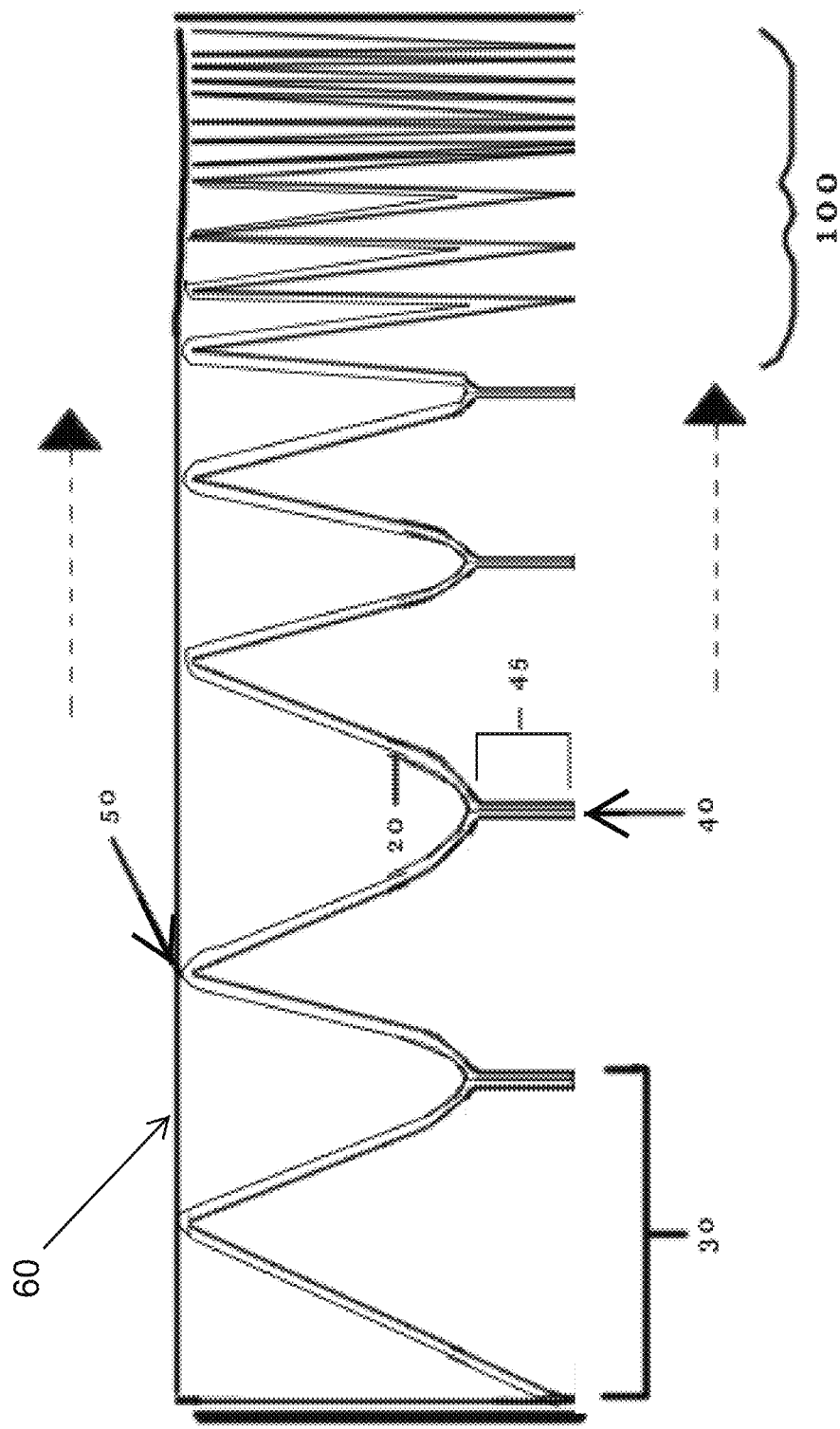

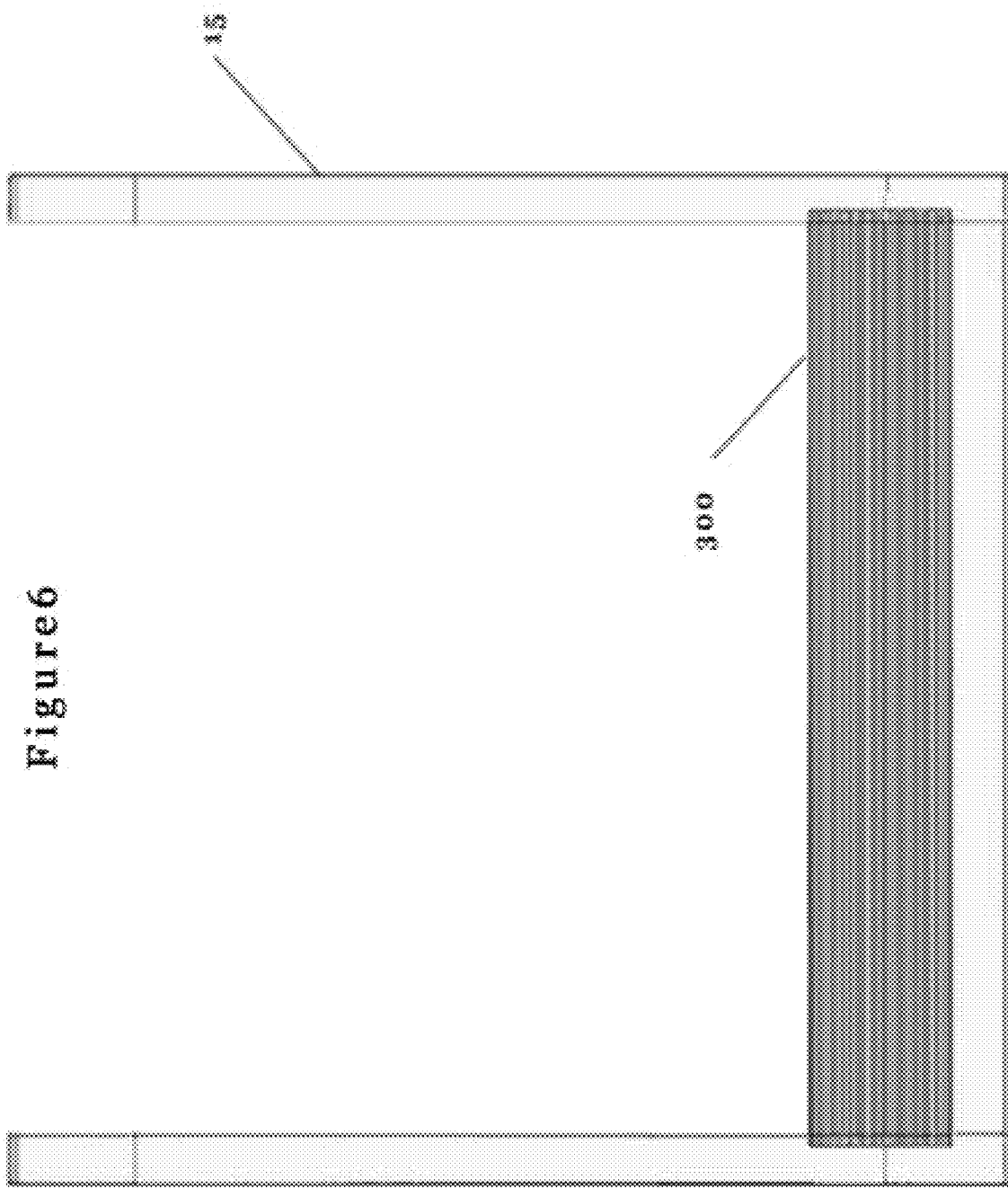

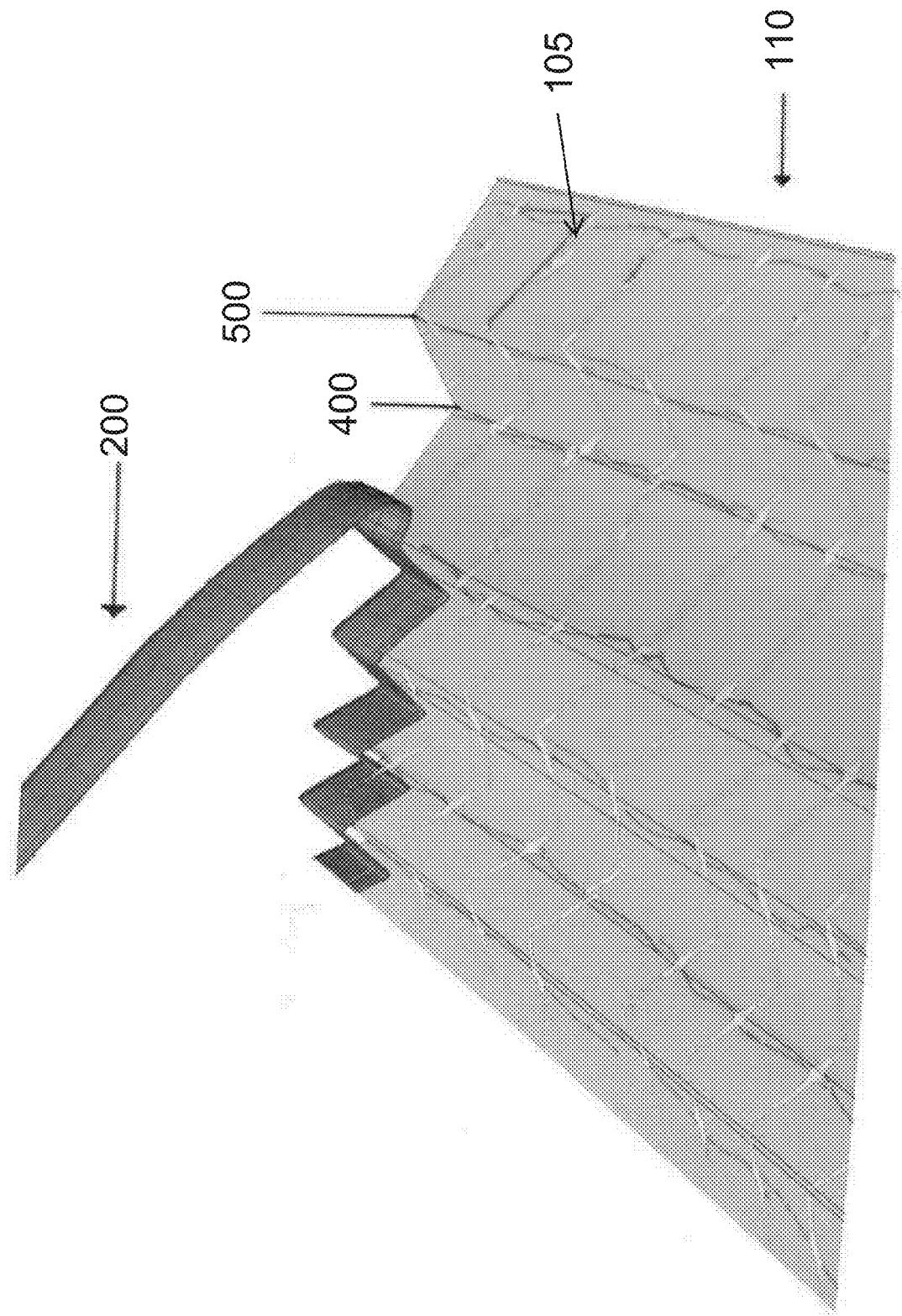

METHOD OF ADHERING A PLEATED FILTRATION MEDIA AND FILTER AND MEDIA FILTER STACK USING SAME

CROSS-REFERENCE TO RELATED APPLICATIONS

This application claims priority to U.S. provisional application 61/604523 filed Feb. 29, 2012, which is incorporated herein by reference.

BACKGROUND OF THE INVENTION

1. Field of the Invention

The invention is directed to a method of adhering a pleated filtration media so that the media has a specified pleat spacing and can be selectively deployed from a folded, stored state and placed in an operational state. The invention is further directed to an article of manufacture being a filtration media stack having adhered pleats at a specific spacing such that the filter media in the stack may be selectively removed from the stack and deployed in as part of a filtration operation.

2. Background of the Invention

Filtration as a field is broadening daily. The need for effective filtration in everything from the air we breathe to the water we drink to the electronics we use daily, all these systems require filtration of a gas or liquid. Dirty filters result in lower flow rates which translate to lower efficiency in air filtration. It is often the case that the used filters require cleaning and/or replacement. A lack of maintenance of such filters means the equipment must run longer to accomplish the intended goals, resulting in increased energy usage. The timing for replacing or renewing these filtration mechanisms is therefore important in both improving efficiency and maintaining operational output in most filtration applications. Longer operational life is an important design parameter.

In addition, another important component in almost all filtration operations is balancing flow through the filter and effective removal of contaminants. To increase surface area while maintaining flow, many filters and filter media have adapted a pleated design to filter the flow. This maximizes the surface area for a given dimension. In providing an effective pleated filter media for a filtration operation, it is often the case that a specific density of pleats or pleat spacing or pleats per inch is desired.

In existing filter designs, for instance in, but certainly not limited to, the Heating, Ventilation and Air Conditioning (HVAC) product space, a filter media is typically laid out and then hot glued to a static frame to fix the spacing. The static media remains adhered in the presence of the inflowing air and filters the particulates. Once the filter becomes sufficiently clogged with contaminants, it is replaced. In other non-limiting HVAC examples, methods exist to adhere media, especially high loft media which does not retain a "memory" to allow for easy pleating, in static application in a manner similar to the non-high loft media. The high loft material uses a wire mesh, plastic lattice or similar structure across the entirety of the material, giving it the ability to be shaped or formed. Similarly in other non-limiting examples, in water filtration for instance, a majority of pool filters have highly compact pleat spacing media for filtering contaminants and often have irregular filter shapes. These are often statically adhered to rubberized frames using non-reactive glues. The static designs are convenient, but the static media his results in shorter operational lifespans.

Examples of such static devices include a number of filters from major manufacturers like 3M, CLARCOR and similar producers. For example, 3M and CLARCOR produce a number of residential and commercial filters with pleated filter media. Such as 3M's FILTRETE or CLARCOR's FRESH AIR SPUPRE AND EXTREME AIR PLUS filters. In most, in these filtration operations these filters are and remain static in nature. Extended lengths of operation for filters, which would reduce maintenance visits and thereby improve efficiency in the deployed filter, can be provided through non-static operation, e.g. movement of the filter media.

There does exist some non-static filters and designs, however these have been extremely limited and typically do not allow for the use of pleated media. Some examples of these types of non-static filters and filter operations include for example U.S. Pat. Nos. 7,186,290, 6,152,998, 6,632,269, 6,491,735, 6,402,822, 6,743,282, 6,632,269, 4,331,576, and U.S. Pat. No. 6,152,998. However, these typically do not utilize a pleated filter media, since movement of the media is difficult to accomplish in a consistent manner. Those that do are larger and more specialized, requiring machinery to complete changes and/or special installations which require additional costs and or maintenance and typically change an entire filter in frame. For instance, in U.S. Pat. No. 7,186,290, a stack of filters is cycled through the device. While potentially convenient, the space taken up by this operation is prohibitive in most instances of filtration processes. A need exists for a more effective system of extending the life of a filter media and using the more efficient pleated filter media.

As noted, most existing filtration applications use a static pleated filter media due to difficulties in handling and moving the media, especially in moving the pleated media and maintaining pleat spacing. When forming a non-static media or when a method of manufacture might benefit from compaction of the pleated filter media, special problems arise in the maintenance of the desired spacing. Additionally, due to the movement of non-static media in a filtration operation it is often also desirable to be able to afford some sealing of the sides of the filtration media to prevent leakage of the flow of gas or liquid being filtered that moves with the media. Further, any solution for securing a specific spacing while providing a means of sealing must also allow for the required selective engagement and movement from a stored to a deployed state in a non-static filtration operation.

To date no such pleated, adhered, spaced filter media is available. As such, a need exists for a method of adhering a pleated filter media to secure a desired spacing, provide sealing, and allow, in the cases of non-static applications, for movement of the media in a non-static filtration operation while providing the aforementioned sealing and spacing.

A further need exists for a device and article of manufacture wherein a length of media is adhered in such a fashion as to provide filtration media in a filtration operation that allows for the filter or filter media stack to secure a desired spacing in the pleated filter media, provide for sealing when the pleated filter media is deployed, and allow, in the cases of non-static applications, for movement of the media in a filtration operation.

SUMMARY OF THE INVENTION

An aspect of the invention is to provide a method of applying an adhesive that will selectively adhere a pleated filter media in a folded/compacted state and allow for efficient removal from the folded compacted state while maintaining a desired pleat spacing and devices and articles of manufacture using same.

Yet another aspect of the invention is to provide a method of applying an adhesive that will selectively adhere a pleated high loft filter media in a folded/compacted state and allow for efficient removal from the folded compacted state while maintaining a desired pleat spacing while still adhering at least a portion of each pleat and devices and articles of manufacture using same.

A still further aspect of the instant invention is to provide is to provide a folded, pleated media stack having an adhesive that will selectively adhere the pleated filter media in a folded/compacted state and allow for efficient removal from the folded compacted state while maintaining a desired pleat spacing and adhering at least a portion of each pleat in the stack to prevent leakage of a media being filtered through the edges of the folded, pleated media stack when selectively removed and put in an operational position or state.

Yet another aspect of the invention is to provide improve the efficiency of the methods of formation of a folded, pleated media stack.

An aspect of the invention is to provide an adhered pleated filter media that improves manufacturing efficiency in both static and non-static filter production.

A still further aspect of the invention is to improve spacing control in non-static pleated filter media movement.

Yet another aspect is to reduce costs of production and operation of existing filters through the use of consistent, controllable, spaced, and adhered filter media stacks.

Another aspect is to reduce the overall costs of deploying filter media by providing an efficient and movable pleated filter media stack and method of manufacturing and using same.

The invention includes an apparatus, an article of manufacture and a method for method of adhering a pleated filtration media and filter and media filter stack using same.

The method of the invention includes method of manufacturing a selected spacing folded, pleated media stack by preparing a pre-pleated sheet of filter media having pleats with peaks and troughs throughout its length; applying an at least one adhesive element along the pre-pleated sheet of filter media applied to all of the pleats; advancing and cutting the pre-pleated sheet of material to specific length to form a cut length of pre-pleated sheet of filter media with the at least one adhesive element applied thereon; compressing the cut length of pre-pleated sheet of filter material, the process of compressing the cut length of pre-pleated sheet of filter media resulting in folding of the pleats and adherence of the pleats of the cut length of pre-pleated sheet of material into a folded, pleated filter media stack that is selectively separable; selectively separating the folded, pleated filter media stack and selecting a pleat spacing for a selected pleat spacing section, the size of the pleat spacing section corresponding to the selected pleat spacing; further application of an at least one spacing support element at the peaks of each pleat in adhesive contact with the selected pleat spacing section, adhering the peaks of the selected pleat spacing section to the at least one spacing support element to secure the selected pleat spacing in the cut pre-pleated filter media material that comprises the folded, pleated filter media stack; and refolding and recompressing the folded, pleated filter media stack and the at least one spacing support element into a selected spacing folded, pleated media stack wherein the media stack is adhered and can be selectively removed to extend the folded, compacted filter media pack from the folded, compacted state to a deployed state with the selected pleat spacing.

The step of applying the at least one adhesive element can include applying multiple adhesive elements at multiple application points across the pre-pleated sheet of filter media. The step of applying the multiple adhesive elements can include applying three lines of adhesive elements, wherein the adhesive elements are three lines of double sided tape with an adhesive The step of applying the multiple adhesive elements can include applying the three lines of adhesive lengthwise on the pre-pleated sheet of filter media with a first line being on a first edge of the pre-pleated sheet of filter media, a second line being at a middle point of the pre-pleated sheet of filter media, and a third being on a second edge of the pre-pleated sheet of filter media.

The method of applying multiple adhesive elements at multiple application points across the pre-pleated sheet of filter media can include applying perpendicular lies of multiple adhesive elements across the pre-pleated sheet of filter media.

The step of applying an at least one adhesive element can include the further step of varying at least one of the type, angle, distribution, location, and type of adhesive as between the at least one adhesive element. The method of claim 3, wherein applying three lines of adhesive elements further comprises the method step of varying the application of at least one of the angle, distribution, location, and type of adhesive as between the three lines of adhesive elements.

The method step of applying adhesive elements can further include applying an at least one adhesive element selected from the group comprising at least one of glue spots, adhesive tabs, liquid glue, hot melt, tape, spray on dispersion, pattern adhesives, adhesive single sided tape, adhesive double sided tape, contact adhesives, glue dots, adhesive gel, gel dots, adhesive cloth, tapes with adhesives, meshes with adhesives, any folding member with these adhesives, gelatin, and natural adhesive compounds.

The method can also include applying a hot melt adhesive that is pattern coated onto the length of the pre-pleated sheet of filter media. The step of applying multiple adhesive elements at multiple application points can include moving at least one of the applied multiple adhesive elements in an at least one direction to or from a center point of the pre-pleated sheet of filter media so as to vary a resulting point of adhesive contact on individual pleats of the pre-pleated sheet of filter media.

The method of claim further including applying an at least one protective liner component on the at least one adhesive component to selectively protect against adhesion of the pleats of the pre-pleated material during the manufacturing process. The method can include the step of removing the at least one protective liner applied to the at least one adhesive element.

The method where the step of selectively separating the folded, pleated filter media stack further comprises selectively separating each pleat the entire pleat, releasing the at least one adhesive element in contact therewith, prior to the selection of a pleat spacing section and the step of applying a spacing support element. The method can also include the step of selectively separating the folded, pleated filter media stack further comprises selectively separating each pleat along only a portion of the pleat, releasing only a portion of each pleat, prior to the selection of a pleat spacing section and the step of applying a spacing support element.

The method further include a method step of selectively separating the folded, pleated filter media stack along an at least one portion of the length of each adhered pleat for a selected pleat spacing section corresponding to a selected pleat spacing or pleat per inch further comprises application of a spacing selector device to select the selected pleat spacing section. The selected pleat spacing can be between about 0.5 to about 20. The selected pleat spacing can be between about 1 to about 10.

The method step of selecting the pleat spacing can include selecting a pleat spacing that is relate to at least one of the density of the liquid being filtered, the density of the gas being filtered, the duty rating of the filter media, and the type of filter material.

The step of applying the at least one adhesive element and in the step of applying the spacing support element, dissimilar types of adhesive elements are utilized. The sheet of filter media can be a sheet of high loft filter media and the step of preparing a pre-pleated sheet of filter media having pleats with peaks and troughs throughout its length can further include preparing a high loft sheet of media, scoring an at least one support grid to allow for forming of pleats, adhering the support grid to the high loft sheet of media and folding the high loft sheet of media to form a pre-pleated sheet of high loft filter media.

The method of further application of an at least one spacing support element can further include application of a netting member across the width of the sheet of high loft filter media adhering the netting member to the peaks of the selected pleat spacing section to secure the selected pleat spacing in the cut pre-pleated high loft filter media sheet and the refolding and recompressing step further comprises refolding and recompressing the cut pre-pleated high loft filter media sheet such that the cut, pre-pleated high loft filter media sheet is folded and adhered and the netting is similarly folded to form the selected spacing folded, pleated media stack.

The step of applying adhesive elements can further comprise applying an at least one adhesive element wherein the amount of adhesive in the adhesive element is inversely proportional to a desired spacing of the pleats in the pleated filter media.

The article of manufacture claim by the process includes a folded, pleated media stack product manufactured by the method of the instant invention. A further article of manufacture is provided directed to a filter engaging a selected spacing folded, pleated media stack manufactured by the method of the invention.

The apparatus of the invention included a selected spacing folded, pleated media stack having a cut portion of pre-pleated filter media having pleats, each pleat having a top and a trough and a successive top. An at least one adhesive element is provided running along the length of the cut portion of pre-pleated filter media through each pleat from each top to trough to the successive top. An at least one adhered section between the top and successive top of the pleat being adhered by the at least one adhesive element is provided. An at least one pleat spacing section is located wherein the at least one pleat spacing section is selected and then an at least one spacing support element is adhered to each pleats top and successive top such that the at least one spacing support element maintains the spacing in the at least one pleat spacing section such that the at least one adhesive element selectively adheres the pleated material in a selected spacing folded, pleated media stack when compressed with the at least one spacing support element further folded and compacted and the selected spacing folded, pleated media stack allowing for selective release of each pleat from the compressed state to an operating state such that the at least one adhered section is retained and the spacing support element maintains the spacing when in the operating state.

Moreover, the above objects and advantages of the invention are illustrative, and not exhaustive, of those which can be achieved by the invention. Thus, these and other objects and advantages of the invention will be apparent from the description herein, both as embodied herein and as modified in view of any variations which will be apparent to those skilled in the art.

SUMMARY OF THE FIGURES

FIGS. 2A-2D show various methods of applying at least one adhesive element to the pre-pleated filter media material in exemplary embodiments of the instant invention.

FIG. 3 shows compression of the pre-pleated filter media material with an at least one adhesive element into a folded, pleated media stack in an exemplary embodiment of the instant invention.

FIG. 4A shows a close up of the pleats being adhered with an at least one adhesive element as the pleats are compressed into the folded, pleated media stack in an exemplary embodiment of the instant invention.

FIG. 4B shows a close up of the pleats being adhered with an at least one adhesive element selectively applied to only a portion of each pleat as the pleats are compressed into the folded, pleated media stack in an exemplary embodiment of the instant invention.

FIG. 5A shows spacing a folded, pleated media stack, selectively engaging a spacing section, and applying an at least one spacing support element to maintain the selected spacing in an exemplary embodiment of the instant invention.

FIG. 5C shows a series of pleats being compressed into a selectively spaced, folded, pleated media stack in an exemplary embodiment of the instant invention.

FIG. 6 shows an exemplary embodiment of an article of manufacture of a selectively spaced, folded, pleated media stack in a frame of the instant invention.

FIG. 9 shows a sheet of high loft filter media applying an at least one adhesive element thereon.

DETAILED DESCRIPTION OF THE FIGURES

In preparing a replaceable filter with a movable pleated filter component in a filter or the like a need arises for a method of retaining the pleated material in a stacked position and selectively moving an amount of the stacked pleated material into an area for exposure to an airstream while maintaining a specific pleat density or pleat per inch (PPI) and providing for enhanced or reduced seepage of air from the sides of the pleated material when exposed. Reference is made to the steps and processes used in manufacture, construction and/or assembly of the invention. These are presented in no particular order and variations in the order of the processes may be used without departing from the spirit of the invention.

The instant invention further comprises a length of pre-pleated filter material. The material is typically used in air filtration and reference is made herein throughout to air filtration, but the process may be adapted to filter other gasses and/or fluids. One non-limiting example is water filtration assuming appropriate non-reactive adhesives are used. The instant invention is directed to an article of manufacture and a method for manufacturing, a method of using and a filter using a pleated filter media which is selectively adhered as a pleated filter media stack and then is selectively engaged and deployed by a filter while retaining a specified density of pleats or pleats per inch (PPI) or pleat spacing. In addition, the selective adhesion in the completed process also helps prevent excess leakage of the media around the filter and in particular from the ends of the pleated filtration material when deployed.

Figure 1:
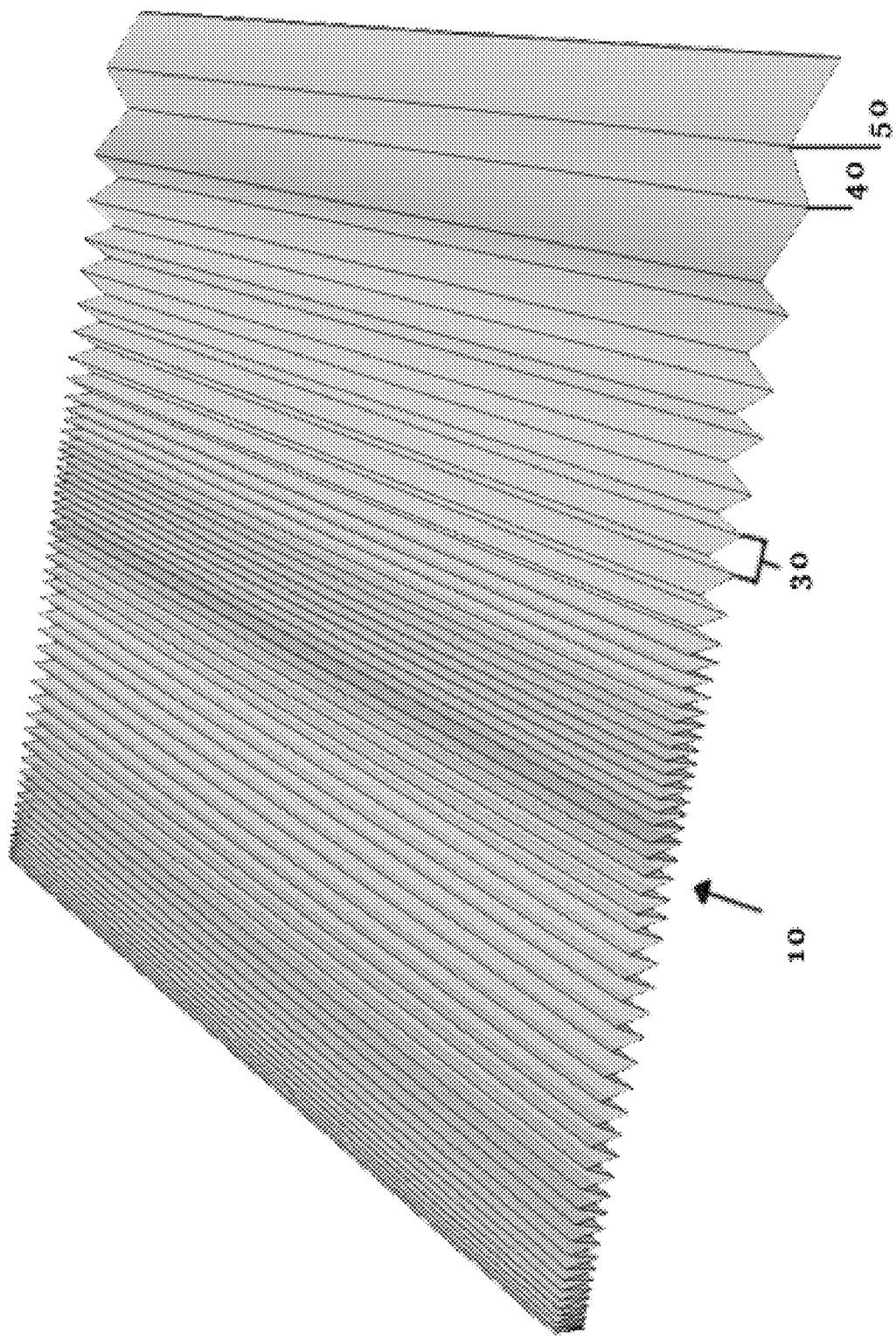
FIG. 1 shows preparation of a pre-pleated filter media material in an exemplary embodiment of the instant invention.

FIG. 1 shows preparation of a pre-pleated filter media material in an exemplary embodiment of the instant invention. As seen in FIG. 1, a pre-pleated sheet of material 10 is provided. The sheet is shown cut to length, but a continuous roll or stream of media is contemplated as well. The pre-pleated sheet of pleated material sheet 10 has pleats 30 therein. The pleats are continuous and provide a valley or trough 40 in between successive tops or peaks 50. The pleated material sheet 10 is fully reversible, effectively making the lowest, trough or valley points the highest or tops or peaks on the reverse side.

In further embodiments, as discussed herein below, additional components, for instance a wire or plastic mesh, can be applied or similar support structures applied. In addition to structural components, additional treatments or processes may be applied to the pre-pleated sheet 10. Some non-limiting examples of such process include electro-static charging, chemical treatments, or the like and similar processes and applications. In each instance, additional processing is contemplated, as noted below, to allow the material to be compacted in the instant invention, for instance as noted below in relation to the addition of a mesh in the further embodiment of FIGS. 8A-11 herein below.

FIGS. 14A, 14B, 14C, and 14D show a further step of applying at least one adhesive element to the pleated filter media material in an exemplary embodiment of the instant invention. An at least one adhesive element 20 is provided along a location on the media. In the exemplary embodiment of FIG. 1 these are an at least one line of adhesive 20, though the pattern may be varied as discussed herein throughout in relation to the exemplary embodiments as shown for instance in FIG. 2C. Reference is made to an adhesive element 20; this can be simply an adhesive or a structural element with adhesive. Similarly reference is made to support spacing element 60, herein below, and likewise it can be simply an adhesive or a structural element with adhesive or a structural element that is coupled to an already placed adhesive.

Figure 2B:
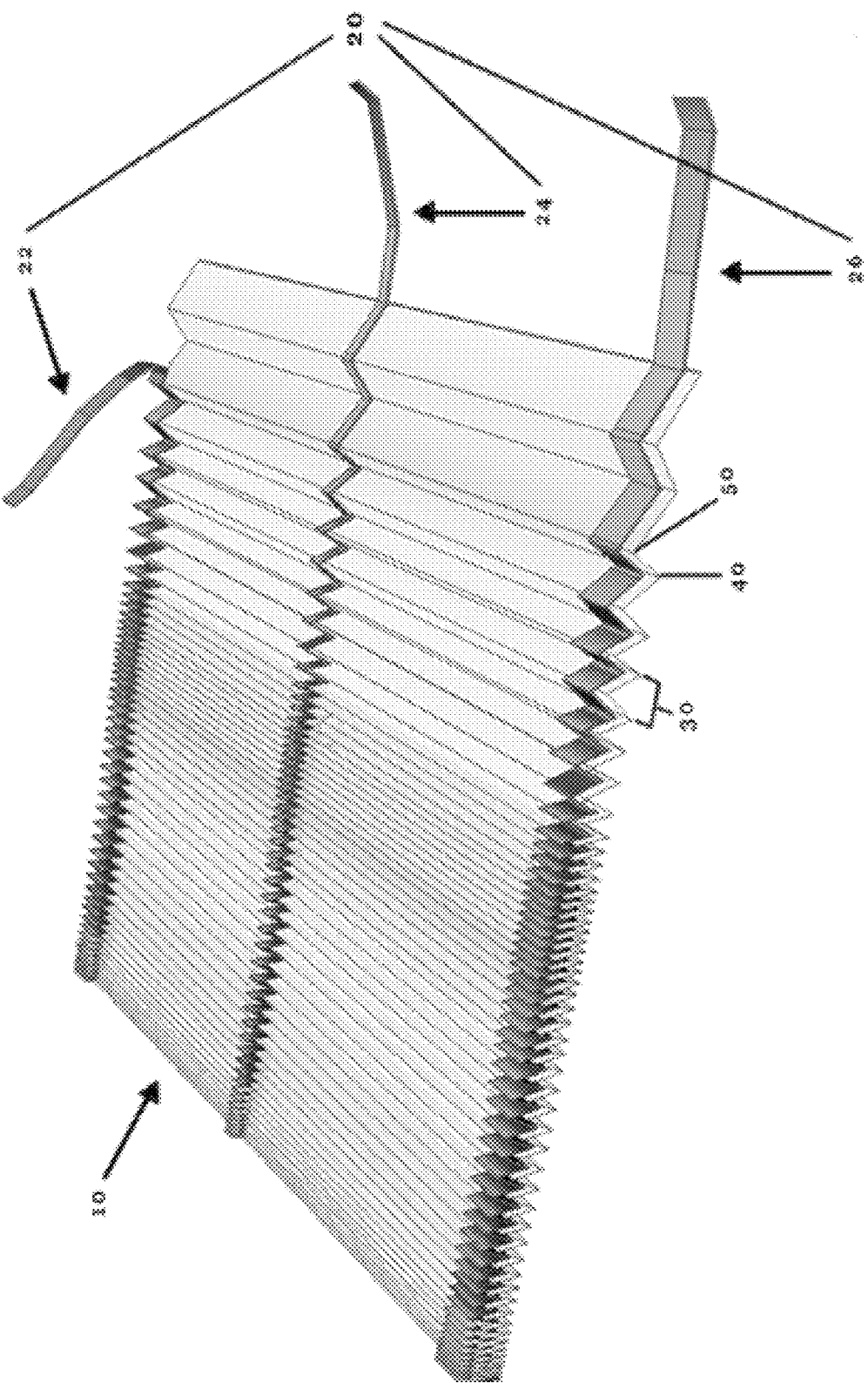

Multiple adhesive application points can be provided anywhere along the width and length of the pre-pleated sheet of material as described in the exemplary embodiments of the invention without departing from the spirit and intent of the invention. In this instance, as seen in FIG. 2A the at least one adhesive element 20 is comprised of three lines of adhesive elements are provided 22, 24, 26, in the form of a double sided tape adhesive. Variations in the configuration of the adhesive elements are herein contemplated, for instance in further non-limiting exemplary embodiments of the adhesive elements, the middle line of adhesive elements 24 of the pre-pleated sheet of material 10 running lengthwise is shown in FIG. 2B and is omitted in the embodiment of FIG. 1 herein and in the embodiment of FIG. 2C herein.

Furthermore, the type, angle, distribution, location, type of the at least one adhesive element 20 and other variables in the selection and/or location of the at least one adhesive element 20 may be varied to suit a particular application without departing from the aspects of the invention. For example, FIG. 2C shows a crossed pattern of the at least one adhesive element 20. Some non-limiting examples of other forms of adhesive are provided in the further exemplary embodiments described herein below in relation to FIGS. 14A-14D. These include but are certainly not limited to liquid glues, glue spots, adhesive tabs, hot melt, tape, spray on dispersion, pattern adhesives, adhesive single sided tape, adhesive double sided tape, contact adhesives, glue dots, adhesive gel, gel dots, adhesive cloth, tapes with adhesives, meshes with adhesives, any folding member with these adhesives, gelatin, natural adhesive compounds and the like and similar mechanisms of controlled application of an adhesive. The adhesive itself may be any adhesive suited for the particular liquid or gas media being filtered and the requirements for the mechanism selectively removing the pleats from the selected spacing folded, pleated media stack.

For example, in addition to utilizing the selective application of a double sided tape as an adhesive as shown in FIGS. 14A and 14B, another non-limiting example can be found in the use of a hot melt adhesive that is pattern coated onto the length of pre-pleated sheet of material and a still further non-limiting example shown in FIG. 2D having a measured glue dot placed in the trough of each pleat to adhere a section of the pleats in a similar fashion as that shown in FIG. 2D. In the case of selectively applied adhesives, such as pattern adhesives or glue dots, the size of the adhesive element will be inversely proportional to the size of the adhesion element, e.g. bigger dot smaller spacing. Such processes would allow for targeted application of adhesive on sections of the individual pleats, allowing use of the process to provide adhesive on a selected portion of the pleat, as discussed above, to vary along any section from peak to trough and back to a peak. Similarly, in conjunction with a connecting material, the uses of a hot melt adhesive on the peaks can be used to adhere the connecting material and secure the spacing through the pleat spacing support element in the filter material.

Similarly, the angle of the application of the adhesive element or adhesive and the process or method of the application of same may be varied to suit the particular needs of the application. In this instance, the application is done as a perpendicular running line on the left, center, and right sides of three lines 22, 24, 26, respectively in FIG. 2A, of double sided tape on the pre-pleated sheet of material 10. In other non-limiting examples of the application, a product may require that the adhesive be applied in a running line at another angle to the pre-pleated material or the line may be moved in and out from the center to vary the points of contact and potentially adjust the adhesion characteristics of the resulting filter media stack 100. One example of such an embodiment is shown in FIG. 2C showing the application of two lines of double sided tape 22, 24 in a crisscrossed pattern.

Additionally, the process may include the use of protective liner components used in conjunction with the adhesive to selectively protect against adhesion during any handling processes. For instance, one non-limiting example would be a protective layer that is typically retained on one side of the tape and can be removed during or after processing. Similarly, though not shown, non-adhesive components or protective liner elements can be placed on the adhesive to selectively render these sections non-adhesive, making a pattern in the adhesive sections.

As best seen in FIG. 2B, the at least one adhesive element 20, here the lines of double sided adhesive tape 22, 24, 26 are adhered to each pleat 30 so as to contact each trough 40 and each top 50 on one side of the pre-pleated filter material 10. This allows for coverage of the entire length of pre-pleated filter material 10. The at least one line of adhesive element 20 is applied to all of the pleats in the pleated filter media stack 100. It should also be noted that the media filter 10A and media cartridge 100 can also be deployed as a cartridge with folded frame portions that is deployed only as a maintenance function. The collapsed filter media, for instance pleated filter media.

FIG. 3 shows compression of the pre-pleated filter media material with an at least one adhesive element into a folded, pleated media stack in an exemplary embodiment of the instant invention. The pleated filter media stack 100 is formed by advancing and cutting the pre-pleated sheet of material 10 shown in FIG. 2 and cutting it to specific length to form a cut length of pre-pleated filter media sheet 15 and then compressing the now cut length pre-pleated sheet of material 15A into the folded, pleated filter media stack 100 as shown in FIG. 3. In the process of compressing the pleated filter media stack 100, the at least one adhesive element 20 is compacted and adheres the pleats in the cut length of pre-pleated sheet of material 15 in the pleated filter media stack 100. The adhesive of the at least one adhesive element 20 is chosen so that it renders the pleats in the folded, pleated filter media stack 100 selectively removable from the stack. In other words, the adhesive bond strength of the at least one adhesive element permits removal of the pleats from the folded, pleated filter media stack 100 by a selective removal device. The folded, pleated filter media stack 100 lacks, however, a specific spacing. That is, to ensure a specific pleat density additional processing of the folded, pleated filter media stack 100 must be undertaken. Additionally, in an exemplary embodiment, the spacing and selective removal from the folded, pleated filter media stack 100 will result in retention of a adhesion along a portion 45 of each pleat 30 in the folded, pleated filter media stack 100 as it is removed, as described herein below.

FIG. 4A shows a close up of the pleats being adhered with an at least one adhesive element as the pleats are compressed into the folded, pleated media stack in an exemplary embodiment of the instant invention. The pleated filter media stack 100 is selectively separated in a further process to transform the filter media stack 100 into the selectively spaced, folded, pleated filter media stack 300 herein described below in relation to FIGS. 5A-5C. In the exemplary embodiment shown, the pleated filter media stack 30A is selectively separated leaving an adhered portion 45 along only a select part of the length of each adhered pleat. However, separation along the entire pleat and/or shorter or longer portions of the pleats is contemplated and within the spirit of the invention. The adhered portion 45 as show acts as a barrier to leakage around the filter media when in a deployed state after being removed from the selectively spaced, folded, pleated filter media stack 300. In addition, the spacing of the filter media making up the folded, pleated filter media stack 100 is set.

FIG. 4B shows a close up of the adhered pleats with an at least one adhesive element selectively applied to only a portion of each pleat as the pleats are compressed into the folded, pleated media stack in an exemplary embodiment of the instant invention. In this instance, an adhesive method is applied such that the pleat tops 50 are not covered by an adhesive element, such as the use of glue dots shown in FIG. 2C or a pattern spray adhesive that is selectively applied.

As the individual pleats in the folded, pleated filter media stack 100 are removed they are separated for a specific filter media density or pleat per inch (PPI). This can be accomplished through a number of methods, so long as the identified or desired number of pleats is selected and an end or peak or fold 50 of each pleat is exposed. A non-limiting method of selecting a PPI in the exemplary embodiment is through the use of a spacing selector device 200 in FIG. 5A shown here as a fork mechanism with a specific tine spacing. Additional spacing device may be used, including but not limited to, helical devices or similar spacing selector devices. The spacing selector device 200 is set to accommodate a specific pleat spacing or PPI and concentrate the selected number of pleats in that spacing within each of the spaces between the tines.

The spacing selector device 200 selects the specified amount of pleats for the pleat density from the pleated filter media stack 100 to form a selected pleat section 70. Pleat density can be, for instance but are certainly not limited to about 0.5 to 20 PPI, preferably about 1 to 10 PPI. This density can be adjusted based on any number of variables, including but not limited to the particular liquid or gas being filtered, the duty rating of the resulting filter, the type of filter material and the like. The pleat ends 50 of the selected pleat section 70 are then adhered by a further adhesive 60 as shown in FIGS. 5A-5C.

FIG. 5A shows spacing a folded, pleated media stack, selectively engaging a spacing section, and applying an at least one spacing support element to maintain the selected spacing in an exemplary embodiment of the instant invention. The spacing support element 60 can be a similar or disparate adhesive element or adhesive as compared with the at least one adhesive element 20. The spacing support element 60 may be applied in any suitable manner and can be varied in any manner as previously noted in relation to the at least one adhesive element 20. The at least one support element 60 should be adhered to the tops of the pleats 50 as shown, however the support element 60 may be adhesive on one side, both sides, or may be adhered by a further adhesive element or component to said pleat tops 50.

Figure 5B:
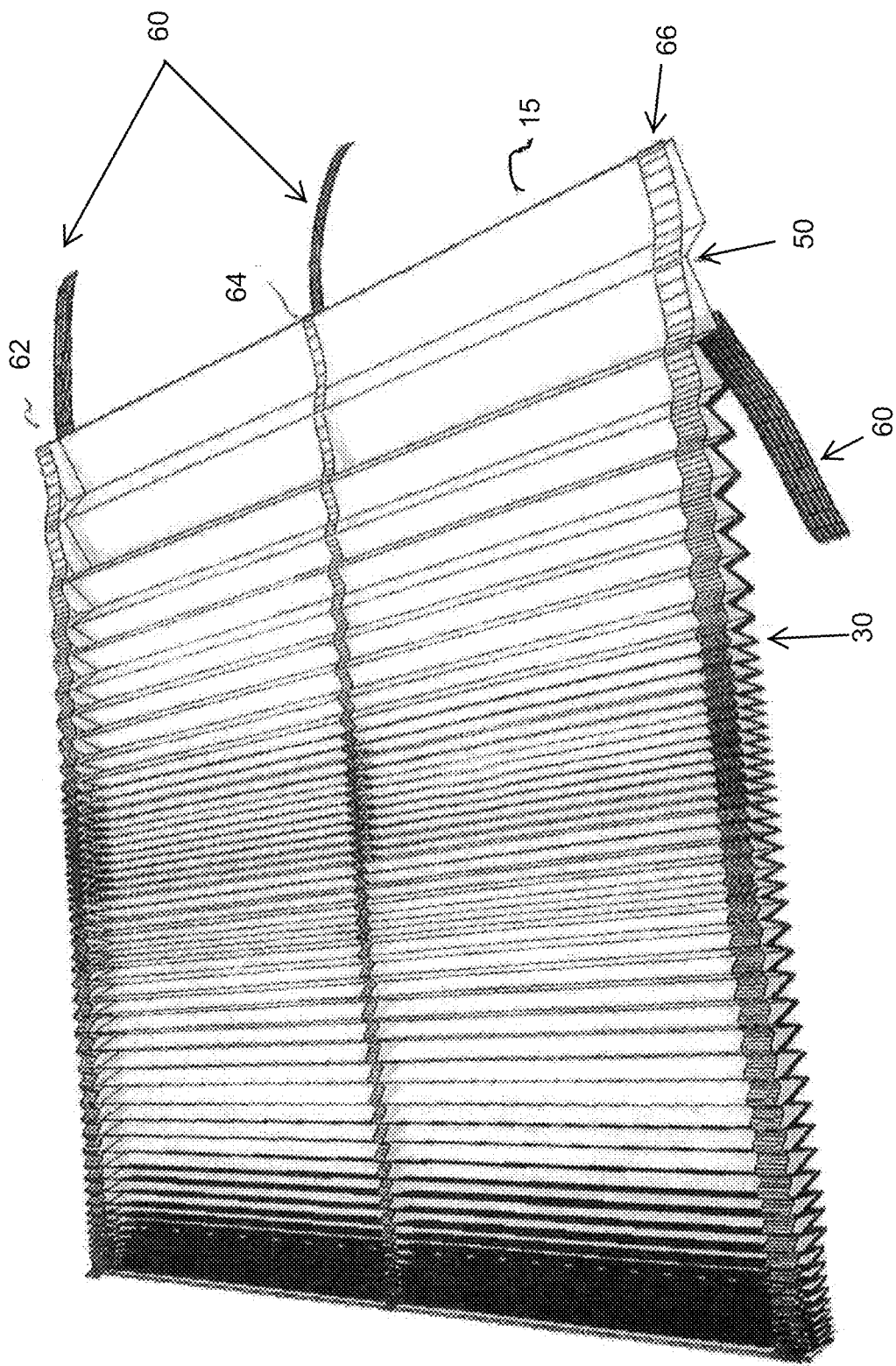
FIG. 5B shows a selected spacing filter media with an at least one spacing support element prior to being compressed to a folded state for storage and transport.

FIG. 5B shows a selected spacing filter media with an at least one spacing support element prior to being compressed to a folded state for storage and transport. In the exemplary embodiment of FIG. 5B, the at least one spacing support element 60 is shown as three lines of spacing support elements having 62, 64, 66 respectively adhesive elements adhering the spacing support elements to the cut sheet of pre-pleated filter media 15. The at least one spacing support member or adhesive spacing support member can be for instance, but is certainly not limited to, adhesive cloth, adhesive mesh, adhesive single sided tape, adhesive double sided tape, glue applied to a folding structure, hot glue applied to a folding spacing support, glue dots applied to a folding spacing support, gels applied to a folding spacing support, gel dots applied to a folding spacing support, gelatin applied to a folding spacing support, natural adhesive compounds applied to a folding spacing support and the like. The spacing support element 60 should likewise be suitable and non-reactive for the application and liquid or gas being filtered.

In the exemplary embodiment shown, the three lines of spacing support element 62, 64, 66 are single sided tape. The three lines of spacing support elements 62, 64, and 66 each contact each of the pleat tops 50. In this instance, the three lines of spacing support elements 62, 64, 66 are in adhesive contact with the pleat tops 50 through pressure sensitive adhesive on the same side of the cut filter media sheet 15 making up the folded, pleated filter media stack. Further spacing support elements 60 may be applied to either side of the cut filer media sheet 15. Any of the at least one spacing support elements 60 can be adhered to the same side or the opposite side from the at least one adhesive element 20. Thus, if applied to the reverse side, they are in adhesive contact with the troughs 40 in the previous application of the at least one adhesive element 20 in that configuration. The respective pleat tops 50 or troughs 40, depending on orientation, or both are engaged by the spacing support element 60 to lock in the desired spacing as set by the at least one spacing section 70 selection. In addition to locking in the spacing, the spacing support element 60 aids in supporting the pleats 30 from being collapsed in the flow of the medium being filtered. As noted above, adhesion to the tops 50 of the pleats in either orientation is contemplated herewith and will function in a similar fashion.

The at least spacing support element 60, in this case spacing support elements 62, 64, 66, are applied such that each of the pleat tops 50 is secured thereto. The attachment of the spacing support elements 62, 64, 66 is not intended to be released from this point of contact as it secures the proper spacing when the at least one filter media stack 100 is moved to an open or operating position as shown in relation to FIGS. 7A and 7B. The at least one spacing support element 60 remains in adhesive contact with the pleat tops 50 after release from the folded, pleated media stack 300. This "locks in" or secures the pleat spacing or PPI for the selected pleat section 70. The process is repeated for the length of the filter media stack 100.

FIG. 5C shows a series of pleats being compressed into a selectively spaced, folded, pleated media stack in an exemplary embodiment of the instant invention. FIG. 5C shows a series of pleats in an exemplary embodiment of the instant invention. As noted above, as shown in the FIGS. 5A and 5B describing the exemplary embodiment, the pleat ends 50 hold the PPI for the filter media to provide a filter media stack with the selected PPI 300. In addition, the individual pleats 30 remain adhered at a bottom portion or trough 45 and up along a section of the pleat 30. The adhered section 45 along the individual pleats 30 can be provided along the edges or sides of the filter media stack 300, as shown, to prevent seepage around the ends of the media and effectively seal the ends when extended in an operational state while providing for the adhering of the filter media stack 300. This spacing can be removed, as noted above. Additionally, as noted in FIG. 4B, in some applications the pleat tops may be free of adhesive. In these instances, the at least one spacing support element 60 should be affixed through its own adhesive or application of an additional adhesive to the pleat tops to lock in the spacing. The cut sheet of filter media 15 with its pleats 30, having had the pleat tops 50 adhered to an at least one spacing support element 60, are compacted into a selectively spaced, folded, pleated media stack 300.

FIG. 6 shows an exemplary embodiment of an article of manufacture of a folded, pleated media stack in a frame of the instant invention. Following the adhesion of the pleat ends 50 to the spacing support element 60, the folded, pleated filter media stack 100 is returned to a compressed state as show in FIG. 5A with the spacing support element likewise now folded and adhesively attached to retain the selected spacing. The filter media stack 100 is then prepared to be engaged by a filter that utilizes and dispenses the folded, pleated filter media stack 100 into an exposure zone. Applicants co-pending U.S. patent applications, patents, and the description herein describe some exemplary embodiments of such filters and an exemplary embodiment is shown herein below. The article of manufacture of the instant invention shown in FIG. 6 shows the folded, pleated filter media stack 100 with the pleats 40 being adhered by an at least one adhesive or adhering element 20 and the spacing being secured by an at least one spacing support element or spacing adhering element as described herein above in relation to FIGS. 1-6. The folded, pleated filter media stack 100 being placed in a frame 17. The folded, pleated filter media 100 being transportable in the frame or directly deployable in a filtration operation or in a filtration device or application.

In such an application, the at least one adhesive element 20 of each of the pleats 40 is engaged along at least a portion of the pleat 45 between successive peaks 50 and along a trough 40 there between with an adhesive. The pleats 40 are each selectively removable from the folded, pleated filter media stack 100. In an exemplary embodiment, the at least one adhesive element 20A is applied at or near a side 16, 18 of the frame 15. With such a distribution, the folded pleated filter media stack 100 can have the individual pleats 40 selectively removed from the adhesion in such a fashion that each pleat 40 retains an adhered portion 45A and the adhered portion 45 forms a seal along said ends 16, 18, as noted above. The extent of the adhered portion 45 of the pleat 40 can be varied based on the implementation or the adhered portion 45 may be avoided based on the application of the spacing support element 60 and the pleat spacing in the particular folded, pleated media filter stack 100 or filter using folded, pleated media filter stack 100. Similarly, as noted herein, the type of adhesive can be varied. Some non-limiting examples of variables used in selecting the adhesive can include release strength, the gas or liquid medium in the flow, reactivity with the medium in the flow, and similar parameters for the folded, pleated media filter stack 100 or filter using folded, pleated media filter stack 100.

Figure 7A:
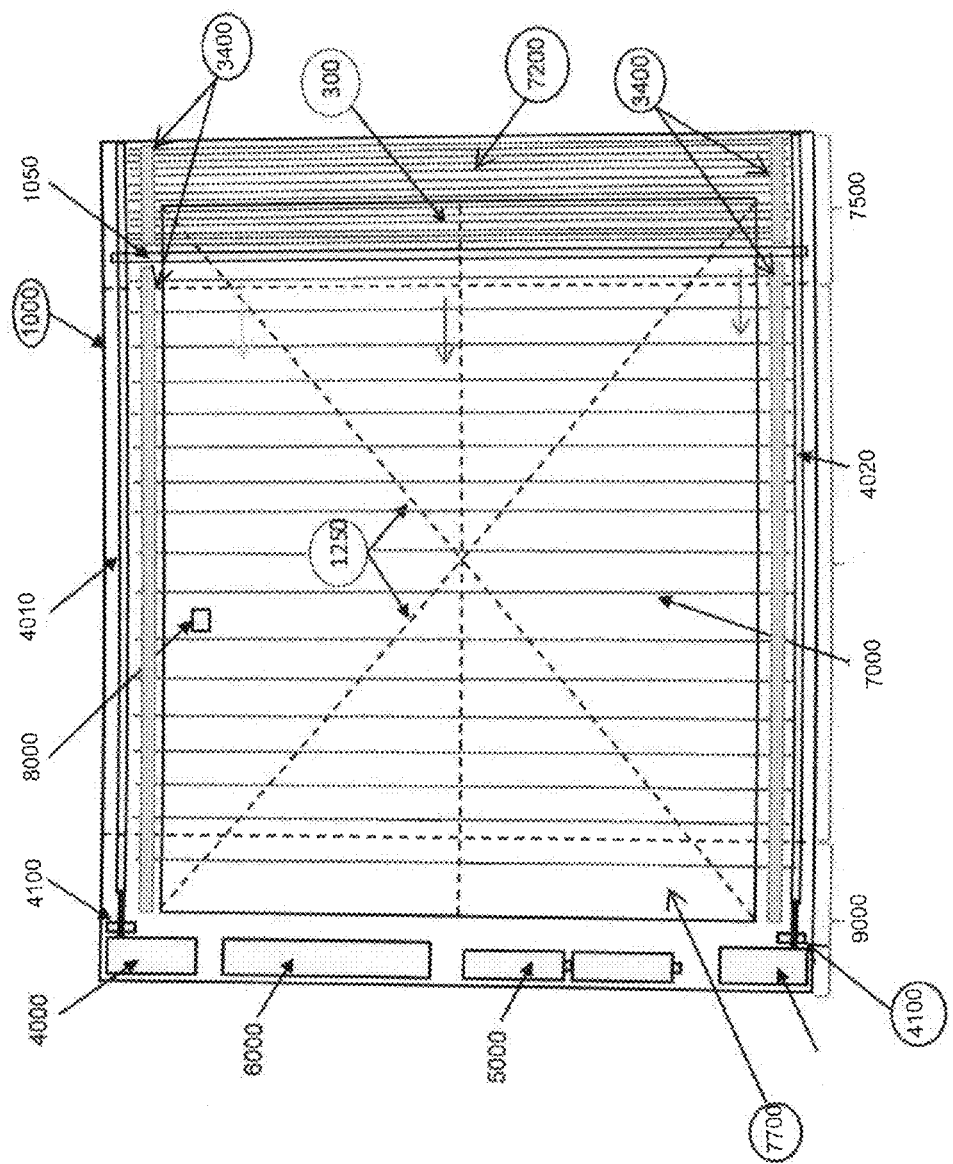
FIGS. 7A and 7B show an exemplary embodiment of a device having a selectively spaced, folded, pleated media stack of the instant invention.
Figure 7B:
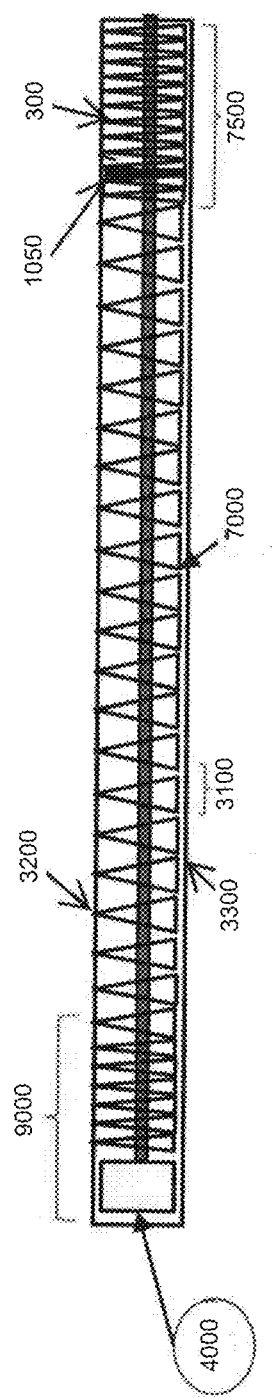

FIGS. 7A and 7B show a top view and side cutaway view respectively of a further exemplary embodiment of the instant invention. A power source 5000 is provided, here the non-limiting example being shown as two batteries. The power source 5000 provides power to the at least one motor 4000, in this exemplary embodiment a non-limiting example having two motors, and a controller 6000. The exemplary embodiment utilizes a folded pleated filter media 7000 stored in one side of the housing or frame structure 1000 forming a pleated filter media stack 300 of uncontaminated filter media 7200 in the filter media storage area 7500.

The folded pleated filter media stack 300 is stored and the pleats are adhered in at least a portion of the space between the tops or peaks 3200 and troughs or valleys 3300 of each pleat 3100 sealing its sides. Additionally a specific spacing of the pleats or "pleats per inch" is provided in the pleated filter media 7000. In this instance, the spacing is kept by an at least one pleat support member 3400, for instance a running length of tape or similar adhesive element as shown running with the same axis as that of the movement of the device. Additional methods, as discussed above and evident to one of ordinary skill in the art, may be used to provide the folded, pleated filter media stack 300 and the at least one pleat support member 3400A, so long as the folded, pleated filter media stack 300 is provided in the compact form and can be selectively removed by the at least one movement member 2000 in the direction shown with the motion arrow in the figures.

The at least one movement member 2000 moves the filter. In this instance the at least one movement member 2000 is a type of screw drive, a threaded rod screw drive. In this exemplary embodiment the at least one movement member 2000 is shown as two threaded rod screw drives 4010, 4020. The pair of threaded rod screw drives 4010, 4020 are each supported on one end by a movement member support 4100A. The at least one motor 4000, in this case a motor for each threaded rod screw drive 4010, 4020, engages the threaded rod screw drive 4010 and turns the threaded rod screw drive 4010 within the movement member support 4100.

A support member 1050 is shown just outside of the at least one exposure slot 7000 inside the pleated filter media storage area 7500. The support member 1050 is used to move the media from the filter stack 300. The support member 1050 in a non-limiting example used in the exemplary embodiment is a plate threaded onto each of the threaded rod screw drives 4010, 4020. Thus the folded, pleated filter media stack 300 is moved from its compacted position to an extended or operating position to replace the exposed filter, effecting a partial or a complete change of the filter material in the exposure slot. In the embodiment shown, there are caps shown in shadow (dotted lines) that cover the housing 1000 and define the exposure slot. In addition to the caps, an at least one housing support 1250, hear a crossed set of members, is shown in shadow.

Each of the threaded rod screw drives 4010, 4020 is engaged by the respective motor 4000 when initiated by the controller 6000. The controller 6000 signals the motor 4000 based on any of the aforementioned manners, including but not limited to a timer or a sensor 8000 output. Additionally, the controller 6000 could also be a simple switch activated by a user such as a push button controller. The controller 6000 is provided to selectively determine when to advance the threaded rod screw drives 4010, 4020 by engaging the motors 4000. The controller 6000, as noted above, can be a simple timer. However, in a non-limiting example, as shown in this exemplary embodiment an optical sensor 800 is used to send signal the need for advancement of the pleated filter media.

In this exemplary embodiment the optical sensor 8000 is provided and communicates with the controller 6000. The optical sensor 8000 sends a signal when a threshold measurement is reached. Software on the controller determines when these measurements are made and the threshold levels of obstruction or color change on the exposed filter media 7700. In addition to the frame 10A and the threaded rod screw drives 4010, 4020, as noted housing support members 1250 are provided at an angle from one side to the other on the housing 1000 to provide additional structural support.

The threaded rod screw drives 4010, 4020 engage the support member 1050 when the controller 6000 signals the motor 4000 and begins a change of the filter media 7000 that has been exposed in the at least one exposure slot 7000 to create an exposed filter media 7700 portion. The at least one support member 1050 is pulled toward the motors 4000 in this exemplary embodiment as shown by the arrows denoting movement. The support member 1050 can also be pushed from the side with the motors 4000 without departing from the spirit of the invention. The folded, pleated filter media is unstacked and moved into the exposure slot 7000 by the threaded rod screw drives 4010, 4020 while maintaining the pleat spacing or PPI. The threaded rod screw drives 4010, 4020 then move the exposed pleated filter media 77 through the exposure slot 7000 and into a containment or storage area 9000 at an end of the housing or frame 1000 while simultaneously moving the unexposed pleated filter media 7200 from the filter media stack 4000, selectively removing the pleats from their adhered and stored state to a deployed or extended or unstacked state for filtration of the flow within the flow channel.

In addition to the unitary frame embodiment shown above, the filter media stack may be provided as a separate article of manufacture for use in a cartridge type filter. A non-limiting example of such a filter would simply employ a rail in rail system in the frame or housing in the above example. In one half of the frame or housing that detaches from the other half the storage area would be contained. On the other half would be the containment area. The folded, pleated filter media stack could be replaced by simply separating the housing and replacing one half of the housing. Allowing of course for the backing out and release of the spent media. Other embodiments could also allow for separation of the containment area and the storage area separately, essentially a three part frame. The replacement and the article of manufacture of the instant invention therefore can include the folded, pleated storage media stack in a frame or as a cartridge.

Similarly, though a rectangular frame is contemplated, the movement and systems for moving the folded, pleated filter media stack or use of the folded, pleated and adhered filter media in a static deployed state in a non-rectangular filter is contemplated. Additionally, an embodiment utilizing similar components but simply omitting the controller and power source is hereby contemplated. The housing with a movement member, here a slide or other device, upon which the filter media stack 100, is engaged. The movement member is moved by a user, for instance the filter media stack 100 may slide on rails or as part of a hand cranked screw. The movement member may have sweep bars, as disclosed above in relation to previously disclosed embodiments, and these may be used to keep multiple filter changes in the stack. Alternatively, each filter media stack 100 may be held in place by a release mechanism (not shown), for instance a pull tab. These may be paired with a locking mechanism (not shown) that would lock the expanded filter media stack 100A in its expanded state.

Figure 8A:
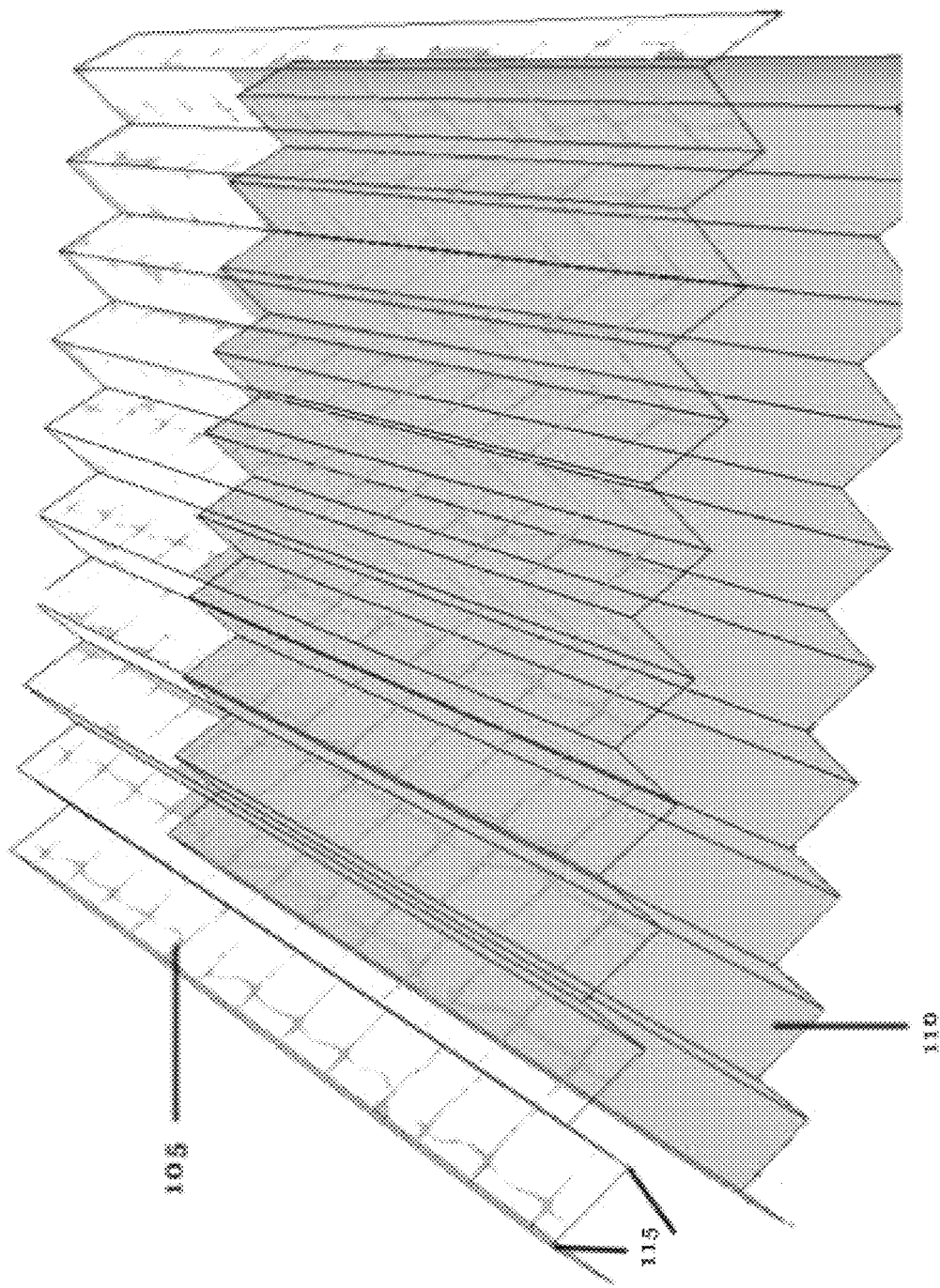
FIG. 8A shows a high loft filter media and a scored supporting grid.
Figure 8B:
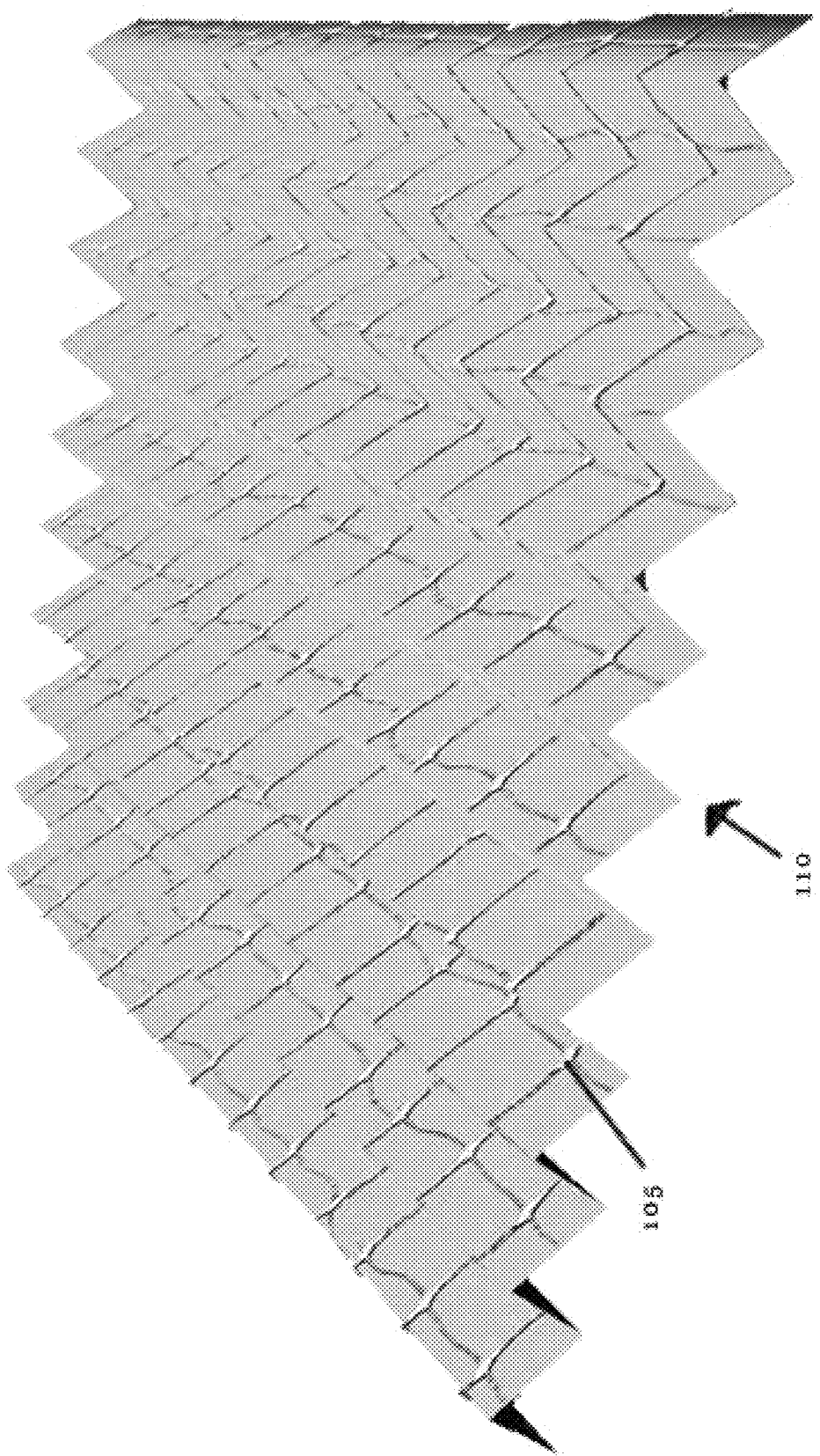
FIG. 8B shows the high loft filter media sheet and scored supporting grid of FIG. 8A adhered to form a high loft media sheet.

FIGS. 8A and 8B show a further exemplary embodiment of the invention for high loft material. High loft material is recognized in the industry as material with a higher width and almost "cotton" fluff like look and feel to it. These materials have less of a weave and no memory for retaining a pleat. A length of high loft material 100 is provided in FIG. 8. Current designs of filters for this material rely on a grid or other lattice like structure adhered across the entirety of the material. A support grid 105 is provided in this embodiment with a sheet of high loft material 100 adhered thereto.

As noted, the support grid 105 is attached to support the high loft material 100A and provide it with memory to retain a shape. In this instance, the support grid 105A is scored with a scoring machine at a score line 115 at a specific point repeatedly across the width of the high loft material 100 to form pleats. The scoring process does not cut the high loft material 100, but does cut or at least partially cut the grid 105 along the score line 115.

FIG. 9 shows a sheet of high loft filter media applying an at least one adhesive element thereon. The grid 105 as scored along score line 115 is now foldable at the score line 115. The high loft material with the scored grid 120 is processed in a manner similar to that above in FIGS. 1-6. Using an at least one adhesive element 200, the high loft material with the scored grid 120 is then folded and compressed along the score lines 115 and adhere the pleats 250 formed by the high loft material with the scored grid 120. This forms the high loft pleated high loft filter media 110. To further transform the cut pleated high loft filter media 117 into an analogous folded, pleated high loft filter media stack 300, in a manner similar to the steps as noted above in relation to the method of FIGS. 1-6 an at least on spacing section is selected, an at least one spacing support member 600 is applied, and the media is folded and compressed. The materials and variables noted for the application of the at least one adhesive element 20 and the spacing support element 600 apply for the at least one adhesive element 200. The type, angle, distribution, location, type of the at least one adhesive element 200 and other variables in the selection and location of the at least one adhesive element 200 may be varied to suit a particular application without departing from the aspects of the invention as noted above.

Figure 10:
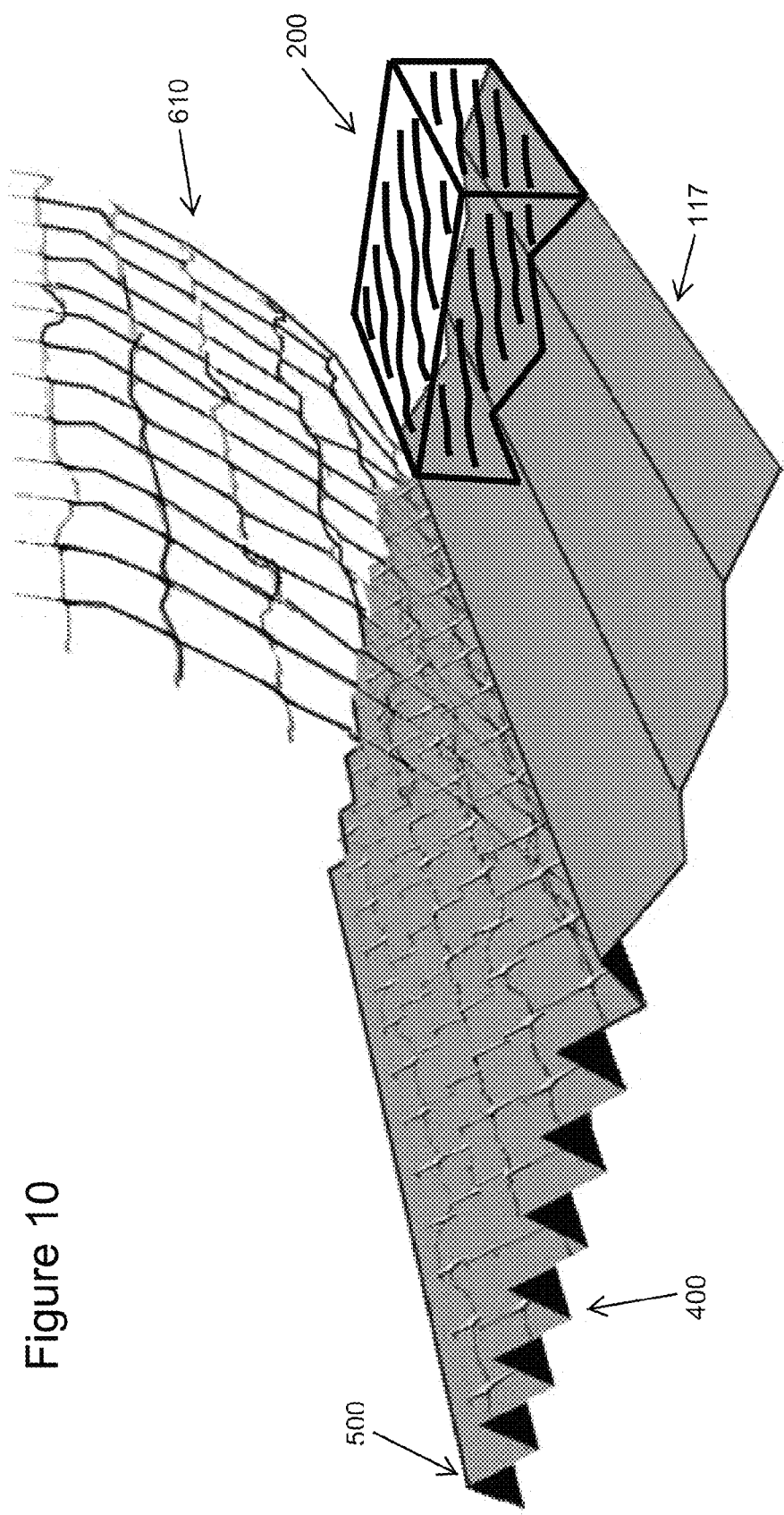
FIG. 10 shows a further step of spacing a high loft folded, pleated media stack, selectively engaging a spacing section, and applying an at least one spacing support element to maintain the selected spacing in an exemplary embodiment of the instant invention.

FIG. 10 shows the at least one spacing support element 600 applied to the cut high loft filter media 117. To achieve the desired folded, pleated high loft filter media stack 300 shown in FIG. 11, the adhered pleats 250 of the cut high loft filter media 117 are selectively separated as above, for instance with a spacing selector device 200 shown in FIGS. 4A-4B above. Although a similar application of an at least one line of tape may be used, another embodiment of the at least one spacing support member is shown in FIG. 10. In the embodiment shown, an adhesive netting 610 is shown. The adhesive mesh or netting 610 is applied to hold the spacing of the pleats 610 as an at least one spacing support member 60A, in the same manner described above in relation to FIGS. 1-6, the adhesive mesh 610 contacting a number of points across the tops 50 of each pleat 30. The end result is a folded, pleated high loft filter media stack 300 that can be provided as an article of manufacture in an identical fashion to that of the exemplary embodiments of FIGS. 1-6 above but using a high loft material.

Figure 11:
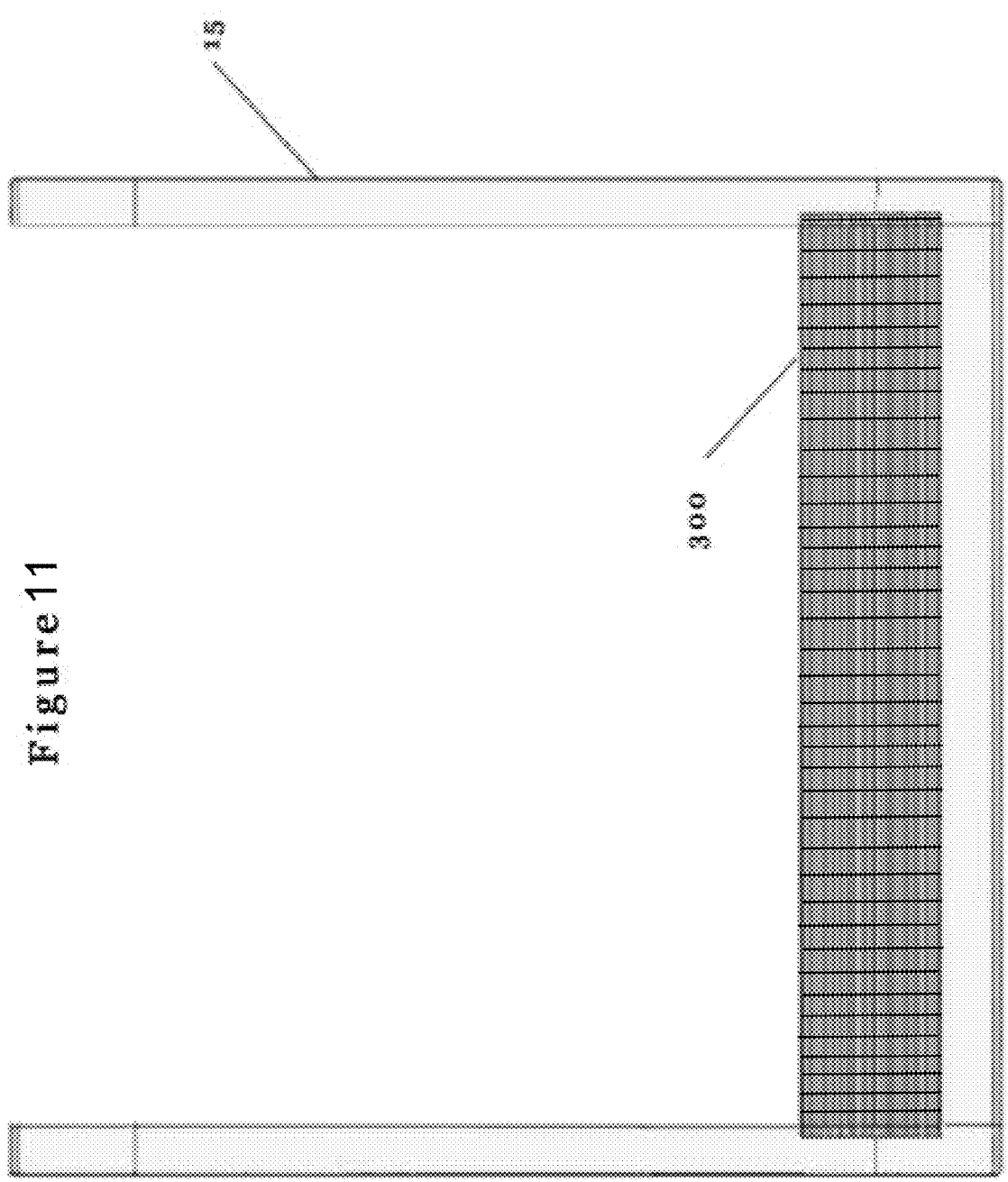
FIG. 11 shows an exemplary embodiment of an article of manufacture of a high loft, selectively spaced, folded, pleated media stack in a frame of the instant invention.

FIG. 11 shows a compressed folded, pleated high loft filter media stack. Similar to the final steps of the exemplary embodiment of FIGS. 1-6, the method provides for an article of manufacture from the method, a compressed folded, pleated high loft filter media stack 300. As noted, to achieve the desired folded, pleated high loft filter media stack 300, the adhered pleats 250 of the cut high loft filter media 117 are selectively separated as above, adhered at the pleat tops 500 to the at least one spacing support member as shown in FIG. 10. The adhesive mesh or netting 610 is applied in addition to the at least one adhesive element 200 to hold the spacing of the pleats, in the same manner described above in relation to FIGS. 1-6, the cut high loft filter media 610 is thus transformed to a folded, pleated high loft filter media stack 300. The end result being the folded, pleated high loft filter media stack 300 that can be provided as an article of manufacture in an identical fashion to that of the exemplary embodiments of FIGS. 1-6 or used in a filter similar to the media stack of FIG. 6 above but using a high loft material.

The embodiments and examples discussed herein are non-limiting examples. The invention is described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A method of manufacturing a selected spacing folded, pleated media stack comprising:
    preparing a pre-pleated sheet of filter media having pleats with peaks and troughs throughout its length;
    applying an at least one adhesive element along the pre-pleated sheet of filter media applied to all of the pleats;
    advancing and cutting the pre-pleated sheet of material to specific length to form a cut length of pre-pleated sheet of filter media with the at least one adhesive element applied thereon;
    compressing the cut length of pre-pleated sheet of filter material, the process of compressing the cut length of pre-pleated sheet of filter media resulting in folding of the pleats and adherence of the pleats of the cut length of pre-pleated sheet of material into a folded, pleated filter media stack that is selectively separable;
    selectively separating the folded, pleated filter media stack and selecting a pleat spacing for a selected pleat spacing section, the size of the pleat spacing section corresponding to the selected pleat spacing;
    further application of an at least one spacing support element at the peaks of each pleat in adhesive contact with the selected pleat spacing section, adhering the peaks of the selected pleat spacing section to the at least one spacing support element to secure the selected pleat spacing in the cut pre-pleated filter media material that comprises the folded, pleated filter media stack; and
    refolding and recompressing the folded, pleated filter media stack and the at least one spacing support element into a selected spacing folded, pleated media stack wherein the media stack is adhered and can be selectively removed to extend the folded, compacted filter media pack from the folded, compacted state to a deployed state with the selected pleat spacing.

2. The method of claim 1, wherein the step of applying the at least one adhesive element further comprises applying multiple adhesive elements at multiple application points across the pre-pleated sheet of filter media.

3. The method of claim 2, wherein the step of applying the multiple adhesive elements further comprises applying three lines of adhesive elements, wherein the adhesive elements are three lines of double sided tape with an adhesive.

4. The method of claim 3, wherein step of applying the multiple adhesive elements further comprises applying the three lines of adhesive lengthwise on the pre-pleated sheet of filter media with a first line being on a first edge of the pre-pleated sheet of filter media, a second line being at a middle point of the pre-pleated sheet of filter media, and a third being on a second edge of the pre-pleated sheet of filter media.

5. The method of claim 2, wherein the step of applying multiple adhesive elements at multiple application points across the pre-pleated sheet of filter media further comprises applying perpendicular lies of multiple adhesive elements across the pre-pleated sheet of filter media.

6. The method of claim 1, wherein the step of applying an at least one adhesive element further comprises the step of varying at least one of the type, angle, distribution, location, and type of adhesive as between the at least one adhesive element.

7. The method of claim 3, wherein applying three lines of adhesive elements further comprises the method step of varying the application of at least one of the angle, distribution, location, and type of adhesive as between the three lines of adhesive elements.

8. The method of claim 1, wherein the step of applying adhesive elements further comprises applying an at least one adhesive element selected from the group comprising at least one of glue spots, adhesive tabs, liquid glue, hot melt, tape, spray on dispersion, pattern adhesives, adhesive single sided tape, adhesive double sided tape, contact adhesives, glue dots, adhesive gel, gel dots, adhesive cloth, tapes with adhesives, meshes with adhesives, any folding member with these adhesives, gelatin, and natural adhesive compounds.

9. The method of claim 1, wherein the step of applying an at least one adhesive element further comprises applying a hot melt adhesive that is pattern coated onto the length of the pre-pleated sheet of filter media.

10. The method of claim 2, wherein the step of applying multiple adhesive elements at multiple application points further comprises moving at least one of the applied multiple adhesive elements in an at least one direction to or from a center point of the pre-pleated sheet of filter media so as to vary a resulting point of adhesive contact on individual pleats of the pre-pleated sheet of filter media.

11. The method of claim 1, further comprising applying an at least one protective liner component on the at least one adhesive component to selectively protect against adhesion of the pleats of the pre-pleated material during the manufacturing process.

12. The method of claim 11, further comprising the method step of removing the at least one protective liner applied to the at least one adhesive element.

13. The method of claim 1, wherein the step of selectively separating the folded, pleated filter media stack further comprises selectively separating each pleat the entire pleat, releasing the at least one adhesive element in contact therewith, prior to the selection of a pleat spacing section and the step of applying a spacing support element.

14. The method of claim 1, wherein the step of selectively separating the folded, pleated filter media stack further comprises selectively separating each pleat along only a portion of the pleat, releasing only a portion of each pleat, prior to the selection of a pleat spacing section and the step of applying a spacing support element.

15. The method of claim 1, wherein the method step of selectively separating the folded, pleated filter media stack along an at least one portion of the length of each adhered pleat for a selected pleat spacing section corresponding to a selected pleat spacing or pleat per inch further comprises application of a spacing selector device to select the selected pleat spacing section.

16. The method of claim 1, wherein the selected pleat spacing is between about 0.5 to about 20.

17. The method of claim 1, wherein the selected pleat spacing is between about 1 to about 10.

18. The method of claim 1, wherein the method step of selecting the pleat spacing further comprises selecting a pleat spacing that is relate to at least one of the density of the liquid being filtered, the density of the gas being filtered, the duty rating of the filter media, and the type of filter material.

19. The method of claim 1, wherein in the step of applying the at least one adhesive element and in the step of applying the spacing support element, dissimilar types of adhesive elements are utilized.

20. The method of claim 1, wherein the sheet of filter media is a sheet of high loft filter media and the step of preparing a pre-pleated sheet of filter media having pleats with peaks and troughs throughout its length further comprises preparing a high loft sheet of media, scoring an at least one support grid to allow for forming of pleats, adhering the support grid to the high loft sheet of media and folding the high loft sheet of media to form a pre-pleated sheet of high loft filter media.

21. The method of claim 19, wherein the method of further application of an at least one spacing support element further comprises application of a netting member across the width of the sheet of high loft filter media adhering the netting member to the peaks of the selected pleat spacing section to secure the selected pleat spacing in the cut pre-pleated high loft filter media sheet and the refolding and recompressing step further comprises refolding and recompressing the cut pre-pleated high loft filter media sheet such that the cut, pre-pleated high loft filter media sheet is folded and adhered and the netting is similarly folded to form the selected spacing folded, pleated media stack.

22. The method of claim 1, wherein the step of applying adhesive elements further comprises applying an at least one adhesive element wherein the amount of adhesive in the adhesive element is inversely proportional to a desired spacing of the pleats in the pleated filter media.

23. A folded, pleated media stack product manufactured by the method of claim 1.

24. A pre-selected spacing folded, pleated media stack or cartridge comprising:
a cut portion of pre-pleated filter media having pleats, each pleat having a top and a trough and a successive top;
an at least one adhesive element running along the length of the cut portion of pre-pleated filter media through each pleat from each top to trough to the successive top;
an at least one adhered section between the top and successive top of the pleat being adhered by the at least one adhesive element; and
an at least one pleat spacing section wherein the at least one pleat spacing section is selected and then an at least one spacing support element is adhered to each pleats top and successive top such that the at least one spacing support element maintains the spacing in the at least one pleat spacing section such that the at least one adhesive element selectively adheres the pleated material in a selected spacing folded, pleated media stack when compressed with the at least one spacing support element further folded and compacted and the selected spacing folded, pleated media stack allowing for selective release of each pleat from the compressed state to an operating state such that the at least one adhered section is retained and the spacing support element maintains the spacing when in the operating state.

25. The pre-selected spacing folded, pleated media stack or cartridge of claim 24, wherein the at least one adhering element and the at least one pleat spacing support element are each a self-adhering tape.

26. The pre-selected spacing folded, pleated media stack or cartridge of claim 24, wherein the at least one adhering element is on a first side of the media stack or cartridge and the at least one pleat spacing support element is on an second side of the media stack or cartridge.

27. The pre-selected spacing folded, pleated media stack or cartridge of claim 24, wherein the at least one adhering element is on a first side of the media stack or cartridge and the at least one pleat spacing support element is on said same first side of the media stack or cartridge.

28. The pre-selected spacing folded, pleated media stack or cartridge of claim 24, wherein the at least one adhering element has interspaced non-adhering portions thereon corresponding to elements within the spaced pleats.

29. A filter media cartridge, comprising:
an at least one frame member having a pleated, folded filter media mounted therein; and
an at least one movement member having the pleated folded filter media mounted thereon and free to move thereon, wherein the pleated folded filter media mounted thereto has an at least one adhesive element attached which is compressed such that the pleats of the pleated folded filter media are adhered when in a compacted pleated folded media stack within the housing the filter media cartridge being deployed from the compacted pleated folded media stack when in a filter device and moved from the adhered compacted pleated, folded state to an expanded state while providing side sealing in the filter device.

30. The filter media cartridge of claim 29, wherein the at least one movement member is a motor.

31. The filter media cartridge of claim 29, wherein the at least one movement member is a user manually moving the filter media stack within the filter media cartridge.

32. The filter media cartridge of claim 31, wherein the at least one movement member is pull tab pulled by the user.

33. The filter media cartridge of claim 29, further comprising a locking mechanism, wherein the movement member moves the filter media stack and the locking mechanism locks the media at a position whereby it is deployed.

\* \* \* \* \*